United States Patent [19]

Althen

[11] Patent Number: 5,490,433
[45] Date of Patent: Feb. 13, 1996

[54] SEMI-CONTINUOUS TRANSMISSION

[76] Inventor: Craig L. Althen, 5533 S. Golfcourse Dr., Morrison, Colo. 80465

[21] Appl. No.: 377,284

[22] Filed: Jan. 23, 1995

[51] Int. Cl.$^6$ ..................................... F16H 3/22
[52] U.S. Cl. ................... 74/348; 74/342; 74/458
[58] Field of Search ............................. 74/341, 348, 439, 74/410, 342–346, 432, 458

[56] References Cited

U.S. PATENT DOCUMENTS

| | | | |
|---|---|---|---|
| Re. 13,686 | 2/1914 | Ross | 74/348 |
| 772,531 | 10/1904 | Pletts | 74/348 |
| 939,589 | 11/1909 | Cowles | 74/348 |
| 970,879 | 9/1910 | Borgman | 74/348 |
| 989,426 | 8/1911 | Ross et al. | 74/348 |
| 1,070,538 | 8/1913 | Ross | 74/348 |
| 1,238,198 | 8/1917 | Ross | 74/348 |
| 1,342,887 | 6/1920 | Arnott | 74/348 |
| 1,833,031 | 11/1931 | McIntyre | 74/348 |
| 3,442,156 | 5/1969 | Novinger | 74/793 |
| 3,442,158 | 5/1969 | Marcus | 74/796 |
| 3,608,390 | 9/1971 | Barrett | 74/348 |
| 3,702,571 | 11/1972 | Sainz | 74/341 |
| 3,885,473 | 5/1975 | Stratienko | 74/349 |
| 4,685,348 | 8/1987 | Takami | 74/437 |
| 4,765,195 | 8/1988 | Takami | 74/113 |
| 4,794,811 | 1/1989 | Carrigan et al. | 74/458 |
| 4,854,190 | 8/1989 | Won | 74/695 |
| 5,018,402 | 5/1991 | Roerig et al. | 475/347 |
| 5,181,432 | 1/1993 | Allen | 74/395 |

FOREIGN PATENT DOCUMENTS 5577 of 1915 United Kingdom ..................... 74/349

Primary Examiner—Rodney H. Bonck
Assistant Examiner—Troy Grabow

[57] ABSTRACT

A transmission subunit with an intermediate shaft having continuous gears of progressive pitch diameters interposed between pairs of conventional gears. The geometry of the continuous gears permits input gears, output gears, and/or idler gears to freely and independently slide longitudinally the length of the intermediate shaft without disengaging. Helical or spur cut gears can be used throughout. During shifting, an idler quickly passes from a conventional gear to an intermediate, continuous gear where it changes speed ratio progressively until the new ratio is achieved. At this point the idler quickly moves on to the next conventional gear to complete the shift cycle. An automatic locking mechanism assures precise, fixed alignment. As an example, a semi-continuous subunit consisting of two idler gears and three or four conventional running gears bridged with two or three continuous gears combined with a planetary gearset provides 14 to 22 forward speeds and 7 to 11 reverse speeds. Such transmissions have the capacity for a very broad ratio range, and can mimic the ideal performance standards of a continuously variable transmission. It is intended that this transmission take advantage of microprocessor output control capabilities which are currently under-utilized. This new architecture is simple, rugged, versatile, very efficient, and suitable for both manual and automatic transmissions.

11 Claims, 17 Drawing Sheets

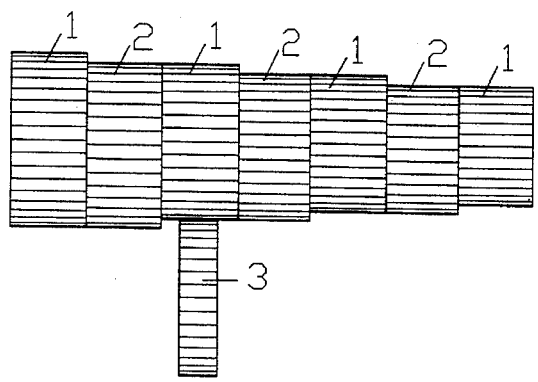
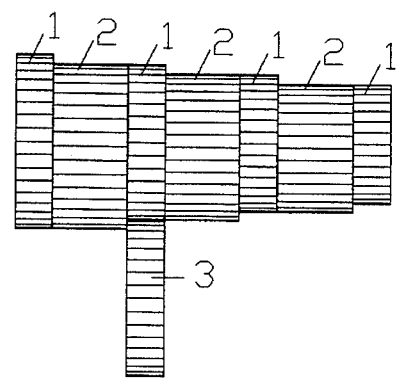
Fig.4A　　　　　　　　　Fig.4B
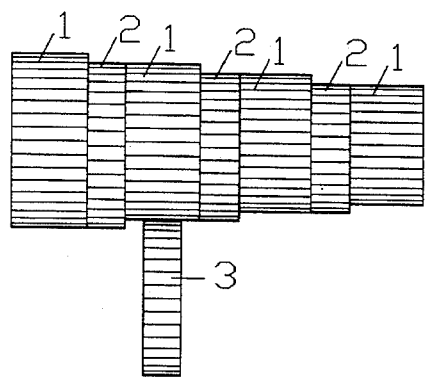
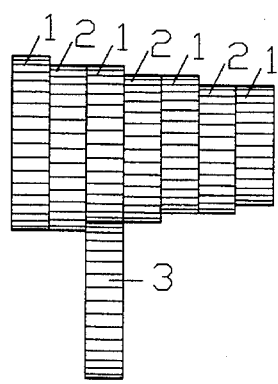
Fig.4C　　　　　　　　　Fig.4D

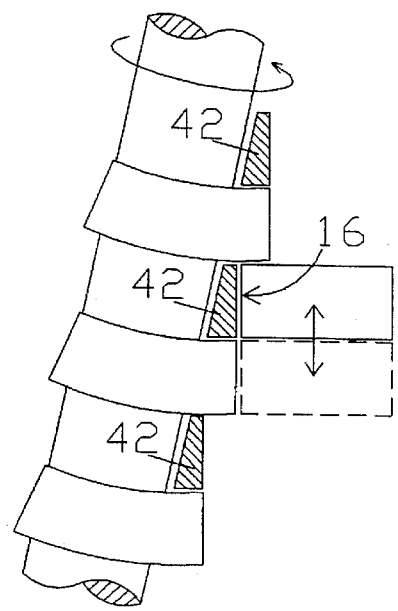
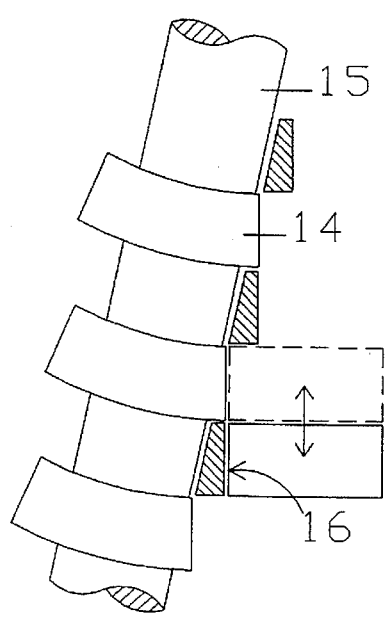
Fig.19A          Fig.19B
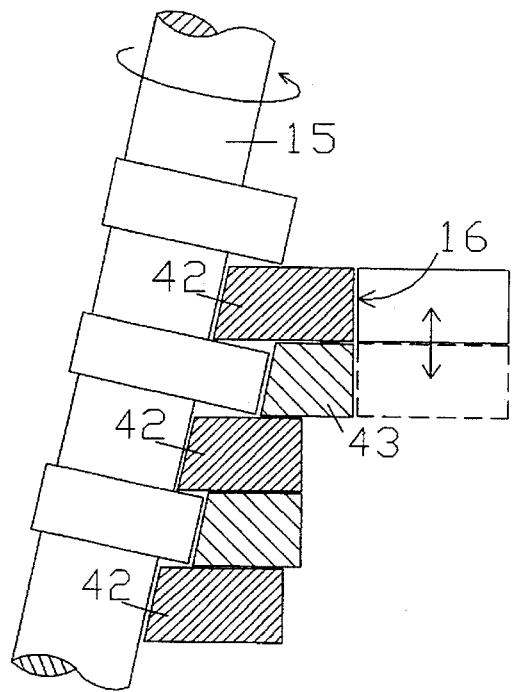
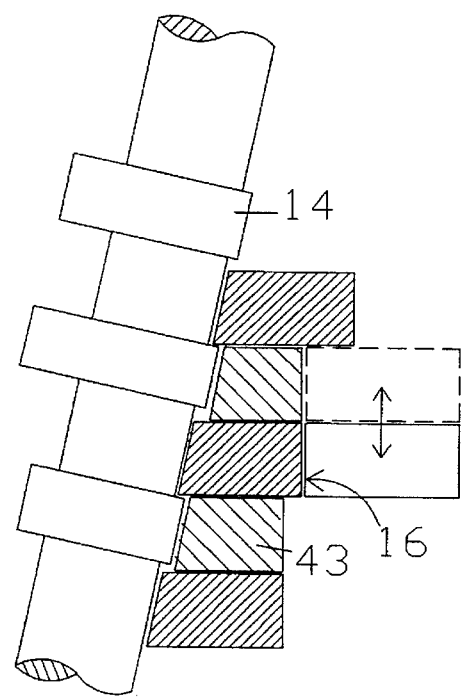
Fig.19C          Fig.19D

SEMI-CONTINUOUS TRANSMISSION

TECHNICAL FIELD

A gear changing mechanism using non-circular, interchange gears to permit a shifting gear to slide longitudinally between pairs of conventional gears by means of a continuous path without disengaging and then providing a locking mechanism to precisely maintain alignment of the sliding gear with the conventional gears.

DESCRIPTION OF THE RELATED ART

A small number of patents clearly show the configuration necessary to achieve continuous engagement of a mating gear which is longitudinally slideable, namely: Pletts (1904) U.S. Pat. No. 772,531; Cowles (1909) U.S. Pat. No. 939,589; Borgman (1910) U.S. Pat. No. 970,879; Ross and Ross (1911) U.S. Pat. No. 989,426; Ross (1913) U.S. Pat. No. 1,070,538; Ross (1914) U.S. Pat. No. 13,686; Hanson (1915) U.S. Pat No. 5,577; Ross (1917) U.S. Pat. No. 1,238,198; Arnott (1920) U.S. Pat. No. 1,342,887; and McIntyre (1931) U.S. Pat. No. 1,833,031.

All of these disclosures relate to manually shifted three-speed transmissions. Clearly the gear trains could have been extended to four-speeds or more. But in only the earliest case, Pletts (1904), is an allusion made to the possibility of adding a second mating gear in order to multiply the possible speed ratios. All subsequent patents conspicuously ignored this suggestion since this was not technologically feasible in that era. Adding a second mating gear would have necessitated adding a second shift lever. Besides not having three hands, there exists the very serious difficulty that the complementary shifts on each side must be essentially simultaneous within a fraction of a second. In addition, it is also quite impossible to keep track of the pattern of movements necessary to shift a transmission with many speed ratios. For example, there could be times when a higher speed ratio is obtained by shifting both sides to lower speed gears but because of inequalities in the two down shifts a net up shift results. Because of the complexity of the patterns, no simple algorithm relates the movement of one side to the other, and there is no immediate way for one manual shift lever to control both sides.

With modern technology, a digital electronics circuit can perform the task. For example, in an 11-speed transmission a microprocessor or a complicated custom circuit of nearly 50 logic gates is required. Pletts (1904) clearly never attempted to work out the details and never appreciated the complexities of shifting a transmission with two mating gears or he would have realized the error in his formula for the number of speed ratios. Specifically, he proposed "n(n−1)+1", where n is the number of speed ratios with only a single gear. However, certain reciprocal positions invariably tend to duplicate ratios. More importantly from a practical point of view is that shifts are best confined to one shift movement per side for any one shift action. This gives a true, realizable formula of "4n−5" for n>1 with a progression of 3, 7, 11, 15 . . . not 3, 7, 13, 21 . . . .

All of the above references only show transmissions with spur gears. Where tooth form is specifically discussed (in Cowles (1909) and Arnott (1920)), spur teeth parallel to the shift axis are specifically designated. By inspection this seems an obvious requirement, and, in general, it is —even for these constant-mesh types of transmissions. But these transmissions shift dynamically, hence the surprising result that helical teeth are possible in certain circumstances and configurations. Specifically, in the singular case where the sliding gear is only an idler, no significant adverse forces are realized as long as the ratio of the linear velocity of the idler's pitch circle relative to the axial shifting velocity is greater than the tangent of the helical angle. This axial speed restriction is inconsequential in the designs disclosed in this patent application. The restriction that an idler be employed is crucial.

Three of the patents displayed transmissions with a pivoting idler: Pletts (1904), Arnott (1920), and McIntyre (1931). In all three cases, and in this disclosure, the idler is disposed so as to pivot about the input shaft axis. Pletts and McIntyre show similar, and recommendable, means of linking the idler to the input shaft gear. Arnott shows a second means which is similar to that detailed in this disclosure. A third means is also described in this disclosure which combines aspects of both methods. There is a great deal of latitude in designing this function.

Likewise there are innumerable designs possible for the means controlling the position of the idler. Longitudinal position control means are diverse but simple to achieve. Radial position control varies greatly and is partially a function of the relative widths of the idler and eccentric, ramp gears. Of the three inventors employing a pivoting idler, only Pletts shows a rigid locking mechanism to prevent radial separation of the idler. However it functioned only during the running phase and not during shifting. Arnott did not discuss this issue, but his locking mechanism appears to be similar to that used by Ross (1913, 1917). Arnott's objects and disclosure focused entirely on his shifting cam mechanism. McIntyre employed spring tension which functioned at all times, but which reduced efficiency and was subject to jarring. As the embodiments described in this application employ helical gears, an additional modality, twisting, must also be allowed for. An improved means for rigidly controlling longitudinal and radial movements during all phases of operation as well as twisting moments are presented in this disclosure.

All of the figures in all of these patents show the concentric, running gears and the eccentric, ramp gears as being substantially the same width with the exception of one figure by Arnott (1920). His FIG. 1 shows the eccentric gears as having an effective width of three-and-a-half times that of the running gears. While this shows the versatility of his cam mechanism, three-and-a-half widths is very poor design for either a low- or a high-speed engine. Arnott did not know how to optimize the relative widths, and he made no mention or claims regarding such. The prior art does not teach the merits of using differential widths for high-speed engines.

Accordingly, the general purpose and primary object of the present invention is to modify and upgrade a short-lived and obsolete technology and combine this with several modern technologies to produce a new and improved subclass of transmissions capable of producing digital simulations of continuously variable transmissions.

Entailed within this primary object are a number of lesser objects, including: to provide an improved variable speed gear mechanism capable of a great number of different speed ratios; to provide an improved variable speed mechanism so configured to make possible the longitudinal sliding of helical cut gears; to provide an improved mechanism for precisely fixing the positions of all gears at all times; to provide a variable speed mechanism with an improved configuration for very rapid shifting when used with high-speed power sources; and to provide an improved transmission under digital electronic control for use as a manually

SUMMARY OF THE INVENTION

Continuous Gears
Intermediate Shaft
Input/Output (I/O) Gears and Shafts
Idler Gear and Idler Gear Carriage
Shifting Control
Other Elements
Alternative Embodiments

CONTINUOUS GEARS

The continuous gears described in this disclosure, hereafter called ramp gears, are composed of four sectors of approximately ninety degrees each. Each ramp gear is designed to be placed between two conventional gears of different pitch diameters. The profile of the first sector of a ramp gear corresponds with an equivalent sector of the larger of the two adjacent gears. The second sector corresponds to a continuous spiral beginning tangentially with the circular sector and progressively spiraling inwards to meet tangentially with another circular sector. This third sector is again circular and corresponds in curvature to the smaller, adjacent, conventional gear. The fourth and final sector is a mirror image of the opposing, spiral sector and provides a ramp up from the smaller pitch diameter to the larger pitch diameter. In practice, a Computer Assisted Design (CAD) program is necessary to design a perfect ramp gear. An involute tooth profile, or one of the common modifications thereof, is recommended. It is preferable that the teeth on the ramp sections be oriented normal to the pitch surface, rather than normal to the center of rotation. A basic ramp gear is comprised of four sectors of similar angular dimensions, but any sector of a ramp gear can, in principle, vary from a one-tooth segment to a segment including most of the circumference.

INTERMEDIATE SHAFT

The central element of this transmission is an intermediate shaft comprised of alternating conventional gears and ramp gears. The conventional, circular gears, hereafter called the running gears, are the gears in which the transmission operates virtually all of the time. These gears form a stack of gears from large to small. The ratio pattern can be any desired mathematical function. The largest running gear is rigidly fixed at one end, then a ramp gear matching this gear and the next running gear is rigidly fixed in place, followed by the somewhat smaller running gear. This pattern is repeated as desired, and culminates with the smallest running gear. While the relative size of each succeeding running gear is quite flexible, sharply changing diameters, and small diameters with small numbers of large teeth may be impractical. The values for typical ramp sectors are from a minimum of about 60 degrees to a maximum of about 120 degrees. These are not limits. The one ramp sector subtending the greatest angle of all the ramp gears defines the timing used for all of the other ramp gears on the intermediate shaft. Ramp sector proportions are typically slightly different from each other. The intermediate shaft is a unified, essentially solid structure. There are no sliding parts or synchronizing elements. Adjacent gears have contiguous, or intimately joined, teeth throughout any sections with a common circumference. Because the gears are inseparable with minimal gaps, or no gaps, a very strong structure results. The interior can be partially hollowed which reduces weight and permits careful balancing of the eccentric ramp gears.

The order of the running gears need not be uniformly from largest to smallest, but this would usually be the most practical. This also gives the greatest number of possible gear combinations. The minimum configuration on the intermediate shaft is one ramp gear with one running gear on either side. This gives two speeds if meshed with one idler or one I/O gear. This gives three speeds if meshed with two idlers or two I/O gears. Using two idlers, a series develops such that the number of speed ratios equals four times the number of ramp gears minus one. More permutations exist mathematically, but they are not all available in a simple shifting schedule where an idler moves only one space per shift.

INPUT/OUTPUT (I/O) GEARS AND SHAFT

At least one external gear must mate with the intermediate shaft to produce a transmission. Using two external gears multiplies the number of possible speed ratios. However any gear enmeshed with the intermediate shaft must be capable of relative movement towards or away from the center line of the intermediate shaft as it shifts between gears of different diameters. If the intermediate shaft is fixed in position, then it is the mating gear and its shaft that must be moveable. If this gear is an input or output gear, it would normally have to be connected by means of paired flexible joints and an extensible splined shaft, or an equivalent arrangement. However, in the embodiment described here, both the input and the output shafts are fixed, so this radial movement is taken up by means of a pivoting idler gear, and hereafter this mating gear will be cited as an idler or idler gear. If the input and output (I/O) gears run the full length of the intermediate shaft, only the idler gears need to be moved to effect a change in the speed ratio. An alternative embodiment, also recommended, is to have discrete I/O gears which slide the lengths of their respective shafts on linear splines. In either case the idlers and I/O gears are in constant mesh. The idlers can slide freely and independently up and down the intermediate shaft by obeying certain timing rules. Similarly, the idlers can longitudinally slide freely up and down the input and output shafts if these consist essentially of one long gear. If the idler is moving in conjunction with a mutually sliding I/O gear which has helical teeth, then there will be an unbalanced axial force. During normal running this thrust can be countered by locks on the idler carriage. During shifting, clutching momentarily can eliminate most of this adverse load. In all cases, shifting is impossible unless the transmission is turning over, but this poses no problem.

Some of the many possible configurations which will not be discussed in detail include: single I/O gear to single I/O stack of shifting units; separate I/O gears to shifting units on intermediate shaft; single fixed I/O gear to idler to I/O stack of shifting units; separate I/O stacks of shifting units bridged by a single idler; separate I/O stacks of shifting units each with idlers connected through a uniform shaft. These and many more possibilities exist, especially when considering compound arrangements in parallel or in series.

IDLER GEAR AND IDLER GEAR CARRIAGE

The idler gears and all of the other gears may be either helical or spur gears. During normal running the axial forces associated with helical gears are balanced, and so nullified, in the case of the idler gears. This only applies to the idler gears; unbalanced thrust persists in the I/O shafts. During shifting, adverse axial forces occur in the idlers if the ratio of the longitudinal shifting velocity relative to the tangential tooth velocity exceeds the cotangent of the helix angle. The resulting backlash need never occur however, since such high shifting velocities are never necessary. Slow shifting velocities, shallow helix angles, and a low moment of inertia in the idlers all act to reduce the forces associated with the changes in the rotational velocity of the idlers due to the longitudinal motion on helical cut teeth. These changes in the idlers' rotation during shifting are not reflected in any changes in the speed of the I/O shaft or the intermediate shaft.

During normal running, a helically cut idler gear will experience an unbalanced torque about an axis perpendicular to the idler shaft which must be allowed for and which can be minimized by mounting the I/O shafts close to the intermediate shaft. The primary means of counteracting this torque is to transfer it to the idler's carriage and then to external locks and braces.

The idler carriage is a support structure enclosing the idler gear and its shaft. The carriage pivots on arms that attach it to the I/O shaft. The attachment arms are widely spaced and contain wide bushings or supports to prevent any binding as the carriage is moved up and down the I/O shaft. This fixes the idler with respect to the I/O gear. If a separate, sliding I/O gear is employed, it is also constrained within this carriage. The carriage has attachment points or surfaces upon which longitudinal and radial positioning devices act. The carriage also has extensions which lock into complementary surfaces of a reinforced frame or to the outer case. These locks fix the position of the idler with respect to the intermediate shaft. These idler carriage locks define the distances between centers, counteract twisting moments, and rigidify the entire structure to combat vibration and noise.

This input/output configuration is very flexible since this transmission is basically symmetrical. The intermediate shaft could be configured to serve as an input shaft or as an output shaft. At least one laterally moving shaft must be associated with the intermediate shaft. Some advantages for using an idler gear for this function are: it enables the sliding element, the idler, to be helically cut without being affected by adverse axial thrust, it is light weight, and it permits strong, fixed shafts for both input and output.

If the mating gear on the intermediate shaft is an I/O gear without an idler, the I/O shaft can be arranged to move towards and away from the centerline of the intermediate shaft in a plane with a fixed angle. All of the ramp gears can be aligned together, and there is no need to allow for varying phase positions. If, as described, the mating gear is an idler gear mounted to pivot about an I/O shaft, this gear will move in an arc. If the arc begins with its tangent normal to the centerline of the intermediate shaft while on the smallest gear, then the arc will describe a series of angles referenced from this initial position as the gear swings away from the centerline in moving to larger gears. The changing angular positions must be allowed for in the initial alignment of the ramp gears, or in the phase positions of multiple cams, or in the phase timing of whatever shifting mechanism is employed. With planning, the design can permit the idler to swing its full range with little change in the angle of contact with respect to the intermediate shaft. Though independent, the input idler and the output idler should be essentially identical in structure and operation.

SHIFTING CONTROL

Most of the time the transmission operates at some fixed speed ratio. But during shifting, the special ramp gears which alternate with the running gears become momentarily active. The idler slips longitudinally from the running gear onto the exactly equivalent surface of the ramp gear. Then the ramp gear presents a gradual decrease in pitch diameter to lower the idler gear from the larger to the smaller running gear. The opposite side similarly ramps the idler up from the smaller to the larger pitched gear. At the end of the ramp the idler merges into another sector identical to the adjacent running gear. The idler then promptly slides sideways onto the next gear.

The action of sliding onto the ramp, ramping up or down, and sliding off onto the next running gear is very smooth and easy when the mechanism is running slowly. At very low rpm's this action can be controlled manually. As the rpm's increase, this action requires progressively more skill in order to time the shifting action to coincide with the proper alignment of the intermediate shaft. Higher rpm's require a snap action with progressively more force to complete the action in a short time. Not only must the timing be perfect, but the necessary forces to slide the idler must be sufficient and continuous. If the shifting action were to stop part way through a shift cycle, it would be destructive. For these reasons the shifting mechanism which coordinates the timing and movement of the idler gear in a fail-safe manner is much more elaborate than the basic gear train.

Motion of the idler as it moves along the intermediate shaft is in three dimensions. The two dimensions of concern are the longitudinal (axial) dimension and the radial dimension in relation to the distance the idler rests from the centerline of the intermediate shaft. In cylindrical coordinates, the remaining variable, angular position, is always finitely determined by the idler carriage's attachment to the I/O shaft.

Motion in these two dimensions must be coordinated. How the two modes of motion interact depends upon the topology of the intermediate shaft. If the face widths of all of the gears of the intermediate shaft are two or more times that of the idler gear, then the idler can, in principle, slide at constant speed the full length of the intermediate shaft in one, long, continuous spiral. Also in principle, a clutch would not be required. The main advantage in having a doubly long intermediate shaft, hereafter called the "long" version, is that the acceleration forces needed to quickly move the idler are minimized. Since acceleration forces are inversely proportional to the square of the shift time, increasing the effective angle of action greatly reduces these forces. A second advantage is that no additional moving parts are required to control the radial positioning of the idler. Deflection of the elongated intermediate and I/O shafts is not a problem as will be shown later. Nevertheless, the length can be reduced to save space. In such cases, the resultant path of the idler becomes one of alternating circular and spiral segments. The path is still continuous.

The three basic ways to reduce the length of the intermediate shaft are: to shorten each of the running gears to equal the idler's width, hereafter called the "short-long" version; to shorten each of the ramp gears to equal the idler's width, hereafter called the "long-short" version; and, to shorten all of the gears to equal the idler's width, hereafter called the "short" version. The differences in these four versions are significant.

The main advantage of the short-long version is that it reduces the length of the transmission subunit by a little more than a fourth compared to the long version. It increases idler g-forces in the longitudinal dimension only by about a third. Radial control is the same as in the long version.

The main advantage of the long-short version is that it reduces the length of the transmission subunit by a little less than a fourth compared to the long version. As will be seen, it also uses isolated radial position control elements. This is a positive feature in that it reduces the overall load on the longitudinal shifting apparatus. The tradeoff is that separate moving parts must be added to regain control in the radial dimension. Longitudinal g-forces are increased about 38 percent.

The short version is of course the most compact of all. The main tradeoff is a four-fold increase in axial g-forces during shifting. Some adjustment to these calculations is possible. Like the long-short, it too requires a separate radial positioning system. Its weight reduction is less than half because the intermediate shaft is largely hollow. An infinite number of other non-integer width combinations are possible. The designer has considerable latitude.

It is important to note that the discussion in this disclosure centers around the extreme forms (the long and the short) in order to present the various principles in the clearest fashion. However, one of the two intermediate versions (the short-long or the long-short) is most likely to represent the optimum configuration for most applications. The short-long is the preferred embodiment.

LONGITUDINAL CONTROL

Shifts must be precise, definite, and complete. The main shifting mechanism must push or pull the idler gear carriage longitudinally during the period the ramp gear is aligned to accept the idler gear. Approximately one-fourth of the ramp gear's perimeter is identical to and contiguous with the adjacent running gear, so this action takes place during approximately one-fourth of a revolution of the intermediate shaft. At this point the idler is either at the top or the bottom of a ramp depending on whether it is shifting to a higher or a lower gear. The action of the shifting mechanism now depends on the length and width of the ramp section. If the size of the ramp is minimized to a short spiral segment with the same face width as the idler, further sideways motion must cease until the idler reaches the end of the ramp. In this case, if a cam is used, the cam must enter a dwell period for about one-fourth of a revolution. The cam runs in 1:1 synchrony with the intermediate shaft. If a linkage, pneumatic, hydraulic, or electromechanical system is used instead of cams, two-stage action is required. However, if the face of the ramp is wider than that of the idler, then the idler can continue to slide sideways with the resultant path moving diagonally across the face of the ramp section.

Possible actuating mechanisms include mechanical, pneumatic, hydraulic, and electro-mechanical. Among purely mechanical means, cams and linkages are immediate possibilities. A mechanical linkage is possible in which a synchronized crank drives the idler in a fashion similar to a piston. Even when restricting the means to mechanical cams, there are still innumerable alternatives. The cam can be a disk cam, a face cam, a cylinder or barrel cam, or others. The cam can be designed for a single revolution or multiple revolutions. It may act in only one dimension or in two. It may act singly, as one of a pair, or as part of a series of cams. The cam can be mounted directly on the intermediate shaft, on a parallel shaft, or on a perpendicular shaft. A cam need simply momentarily activate one or more followers attached to the idler carriage to perform the repositioning.

RADIAL CONTROL

If no dwell period is needed, the positioning of the idler radially from the center of the intermediate shaft can be accomplished with a fixed guide. As the carriage moves, a curved surface, ball, or wheel can run in a track a predetermined distance from the intermediate shaft. The points in the track section paralleling the ramp gears are spaced to correspond to that required by the diagonally moving idler.

In the compact designs with a dwell period, the idler momentarily moves radially without simultaneously moving longitudinally, so a set of cams, or equivalent means, is required to moderate the radial repositioning. These cams need no controls since their relationships are fixed and constant. These cams constantly run in 1:1 synchrony with the intermediate shaft, and their profiles are the complements of the ramp gears. In general they cannot be simple complements because they have to allow for angular disparities due to pivoting of the idler carriage. Also if the positioning cams are offset at an angle to save space, rather than running parallel to the intermediate shaft, their profiles must be further modified. The complementary profiles of the running gears are circles, so no cams are required to oppose these gears. Fixed surfaces suffice, and these surfaces can help lock the idler carriage into position.

In the most compact designs, it is only during the brief period when the longitudinally shifting cam is effectively at rest that the radial positioning cams function. They push the idler in as it runs down a ramp, or they let the idler back away in a controlled fashion from the intermediate shaft as it is forced outward while ascending a ramp. Once the idler is repositioned at the new level, the shifting cam enters its third quarter phase and again smoothly but rapidly pushes the idler sideways onto its new running gear. At this time the radial positioning cam is neutral. During the last quarter of the intermediate shaft's revolution, both cams are inactive. It is during this phase that both the longitudinal shift cam(s) and the radial positioning cam(s) are engaged or disengaged. Both sets of cams remain effectively disengaged until another shift cycle is initiated.

A design employing ramps of approximately two idler widths permits the longitudinal shifting cam to operate with constant velocity throughout much of its cycle and obviates the need for a separate set of radial positioning cams. The ramp section will still entail about a quarter of a revolution at a fairly uniform shifting speed, but the entire cycle can be stretched. Full advantage of the extra time is obtained by employing independent upshift and downshift cams. Similarly, by making the running gears of the intermediate shaft somewhat wider than the idler (long-short version), it is possible to gain an earlier start and therefore a more gradual acceleration of the idler gear at the beginning and ending of a shift cycle. The shift cycle can be stretched in both senses by using the long version. Stretching the shift cycle profoundly reduces the very high inertial forces which must be overcome during the nearly instantaneous shifts.

If the change in diameter between the two running gears is very slight, the period allotted to ramping can be reduced and relatively more time can be allotted to moving on and off the ramp gear. As the diametrical differences increase, a greater part of the shift cycle can be devoted to the period of ramping.

OTHER ELEMENTS

Other key elements of the shifting mechanism include timing mechanisms and locking mechanisms. These two items are interrelated in function. In general, a precise timing mechanism is needed to activate the longitudinal shifting cam. This might entail using a timing signal to release one or more locks that are enabled only after an unambiguous shift signal is verified. Or, the timing mechanism and a shift signal verifying mechanism can independently release locks in a logical "AND" fashion to initiate shifting. Or, the shift signal detection mechanism could unlock the timing mechanism. Both shifting and timing parameters must be continuously monitored and controlled. The idler must be locked in position if it is not in a shift cycle.

While the very quick shifting time is an inherent advantage of this transmission, concerns over the forces involved demand attention. A hydrokinetic link, a clutch, or a similar device for additional smoothing may be necessary in many applications even if a large number of small, speed ratio transitions are incorporated into the design. The speed changes are abrupt and practically instantaneous. Some applications will also require the inclusion of reverse gear(s). One immediate solution is to add a planetary gearset to the drive train. This could have numerous advantages, especially under microprocessor control. The planetary gearset can also provide dual range speed ratios and a neutral. Apart from, or in addition to, a hydrokinetic device, microprocessor control of a clutch using an approach analogous to modern, anti-lock braking systems technology could be used to further smooth the small shifts.

In manual systems a standard clutch could be used as usual. In this case a tremendous boon to safety and convenience for truck and bus drivers exists in that they can never miss or grind a gear, whether shifting up or down. The clutching would be only to relieve shifting pressure and smooth the transition. It would have no immediate influence on the shift's actual timing and execution.

ALTERNATIVE EMBODIMENTS

If the change in diameter between the running gears is extreme, serial ramp gears can be used. A first ramp gear would be disposed as described above, but would only ramp up or down half of the required difference between the two running gears. The idler would then, in essence, off-load onto the on-loading sector of a second ramp gear. This second ramp gear would then ramp the remaining difference. Instead of approximately three-quarters of a revolution, the motion would entail five-quarters of a revolution. A single ramp sector cannot simply be extended indefinitely if the mirror image ramp exists, because they must cross, and the crossing zone must be compatible to travel in both directions. But a series of graded ramp gears is possible. If one running gear pair uses paired ramps, then all pairs must normally do so in order to coordinate with the shifting mechanism.

Employing the above methods of reducing the shifting forces can result in an inconveniently long intermediate shaft. One solution is to isolate serial ramp gears from the intermediate shaft. The intermediate shaft can be comprised of running gears only, and a single extensive series of ramp gears can be employed to shift between all of the intermediate shaft pairs. This entails the constraint that the running gears form a geometric progression such that each gear's diameter is a fixed percentage of its neighbor's. For example, each running gear might be 0.8 times the size of its neighbor. A separate shaft containing serially sized and phased ramp gears culminating in a diminished diameter of 0.8× can be used during the shifting stage between any two adjacent gears.

Instead of a phased series of the usual mirror image ramp gears, the up-shifting ramp and the down-shifting ramp can be placed on separate shafts. In this case the spirals can be continuous since they are independent. Two links are required to the intermediate shaft so that power is uninterrupted when one link is in the process of ramping up or down to become synchronous with its new gear. This extreme version of a continuous ramp gear is directly related to those described earlier. The architecture of such a transmission is based on the same topological principles in spite of its strikingly different appearance. Because the resulting shifting scheme is quite complicated, this alternative embodiment is less attractive and is not discussed.

For extra strength, additional idlers each with their own I/O shaft and shifting mechanism are possible. If employed, the shifting is controlled by only one of the pair. When the duplicate idler set simultaneously receives the shift signal, the release instead lifts the carriage up momentarily and then directly returns it to the next running gear at the end of the shaft cycle. This is coordinated, in essence, by lifting it away from the intermediate shaft a fixed distance. When complete, the carriage repositions itself. The gears will be in perfect synchrony as long as the phase shift due to the separate I/O shaft's position is compatible with the gearing. For example, spacing the input pairs in opposition at 180 degrees, and the output pairs also in opposition, will also assure compatibility since all running gears are always bilaterally symmetrical. Placing a duplicate assembly at only 90 degrees relative to the primary assembly is possible only if the intermediate shaft gears all have even numbers of teeth, since this is necessary in order to achieve quadrilateral symmetry.

LIST OF FIGURES

FIG. 1. End view of continuous gear

FIG. 2. Perspective view of minimum shifting unit

FIG. 3. Side view of intermediate shaft showing alternate pathways

FIG. 4A. Long version of the intermediate shaft

FIG. 4B. Short-long version of the intermediate shaft

FIG. 4C. Long-short version of the intermediate shaft

FIG. 4D. Short version of the intermediate shaft

FIG. 5A. Axial motion curves (long and short-long)

FIG. 5B. Axial motion curves (long-short and short)

FIG. 6. Simplified perspective view of long version subunit with a torsion locking idler carriage FIG. 7. Simplified perspective view of short version subunit FIG. 8. Simplified perspective view of short version subunit using slideable I/O shafts FIG. 9. Side view of one-piece idler carriage FIG. 10. Side view of two-piece idler carriage FIG. 11. Perspective view of idler carriage of short-long version with sliding I/O gear FIG. 12. Perspective view of idler carriage of short-long version with continuous I/O gear FIG. 13. Longitudinal shifting assembly FIG. 14. Arrangement of locking keys FIG. 15A Cross-sectional view of locking key and shifting pin (inactive state)

FIG. 15B Cross-sectional view of locking key and shifting pin (triggered to active state)

FIG. 15C. Cross-sectional view of locking key and shifting pin (returning to inactive state)

FIG. 16A. Standard pattern for longitudinal shifting cam (short version)

FIG. 16B. Compressed pattern for longitudinal shifting cam (short version)

FIG. 16C. Minimalized pattern for longitudinal shifting cam (short version)

FIG. 17. Pattern for longitudinal shifting cam (long version)

FIG. 18. End view of subunit (short or long-short version)

FIG. 19A. Operational diagram of radial cams without extensions (before shift)

FIG. 19B. Operational diagram of radial cams without extensions (after shift)

FIG. 19C. Operational diagram of radial cams with extensions (before shift)

FIG. 19D. Operational diagram of radial cams with extensions (after shift)

FIG. 20. Radial motion curves (long and short versions)

FIG. 21. Plot of gears vs. ratios for 27 speed truck transmission

DETAILED DESCRIPTION OF THE INVENTION

Components
  General Arrangement
  Intermediate Shaft
  I/O Shafts
  Idler Gear and Idler Carriage
  Locking Mechanisms
Shifting
  Longitudinal Movement
  Control of Cam Follower Pin Deployment
  Comparison of Long and Short Versions
  Alternative Configurations
  Radial Movement
  Elongated Versions
  Short Versions
Associated Elements
  Planetary Gearset
  Microprocessor
  Other Components of the Drive Train
System Features
  Manual ("Protected Semi-Automatic")
  Automatic Several specific embodiments are described in this section. None represent a preferred embodiment. This invention is capable of many diverse designs and any preferred embodiment is a function of application requirements. Accordingly only the essential features are illustrated and described here. Many detailed features, including such items as supports, bearings, connectors, and so forth are not addressed in detail as their engineering is within the province of any person skilled in the area of transmission design. Likewise the design and configuration of other transmission subunits, including hydrokinetic links, external drive train, clutches, microprocessor controls, planetary gearsets, preliminary or final drives, and so forth are secondary to the immediate invention. They are also dependent upon the application, and they are discussed at only a cursory level.

COMPONENTS

GENERAL ARRANGEMENT

Figure 1:
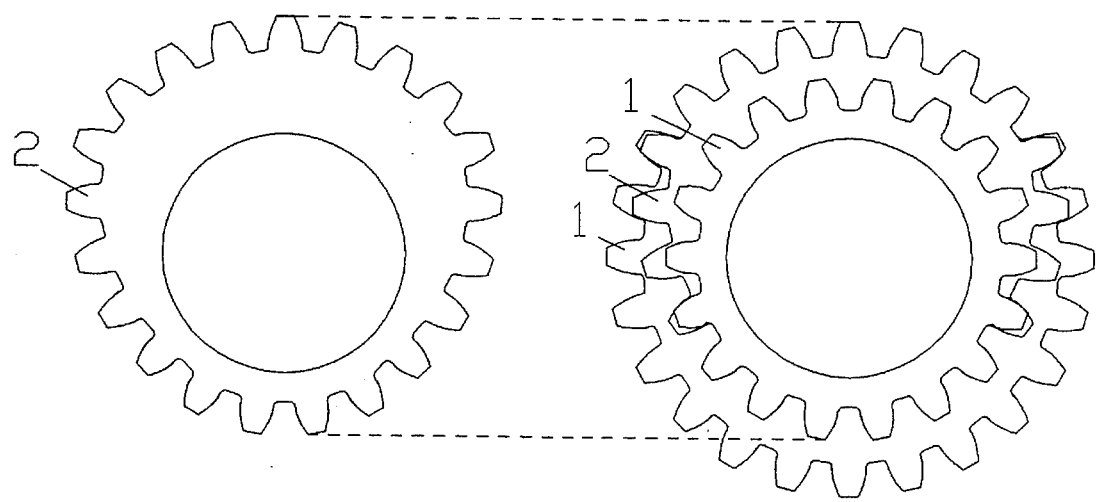
Figure 2:
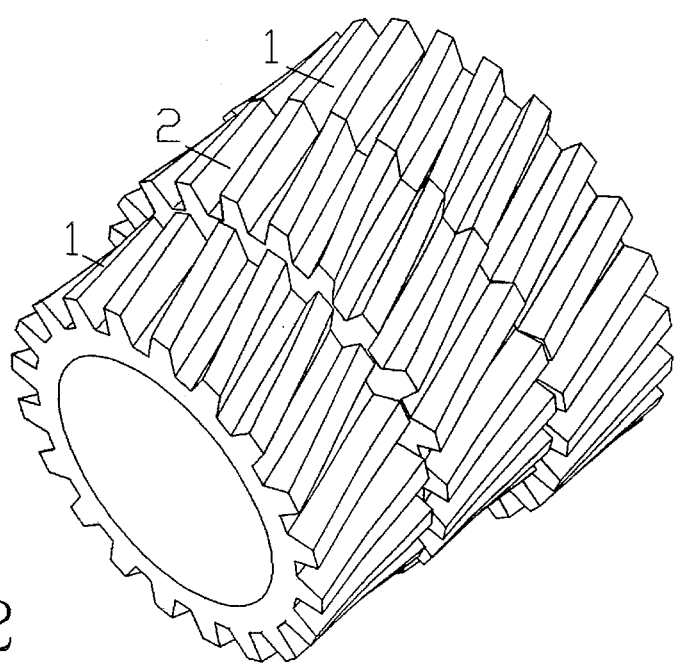

FIG. 1 gives an exaggerated example of a ramp gear 2 with only a limited number of teeth and, for purposes of illustration, an easily discernible change in diameter. Its disposition between two conventional, running gears 1 is indicated. This is shown in perspective in FIG. 2. The three gears of FIG. 2 represent a minimal shifting unit. Such a unit mounted on a rotatable shaft for either input or for output would provide two speeds for a single, longitudinally sliding gear meshed with this unit. If this shifting unit is instead employed as an intermediate member between a longitudinally slideable input gear and a second longitudinally slideable output gear, three speed ratios would be possible. These sliding gears would undergo both longitudinal and radial displacements during their shifting relative to the shaft on which the shifting units are mounted. This shaft would then function as an intermediate shaft. This may be acceptable for light-duty applications involving only small changes in gear diameters. These moving gears would normally have to be mounted on a double-jointed and splined shaft. For heavy-duty applications or for configurations employing a wide selection of speed ratios, the input and output shafts should be fixed in location. This necessitates the use of one or more moveable idlers to bridge the input/output (I/O) shafts and the intermediate shaft.

INTERMEDIATE SHAFT

Figure 3:
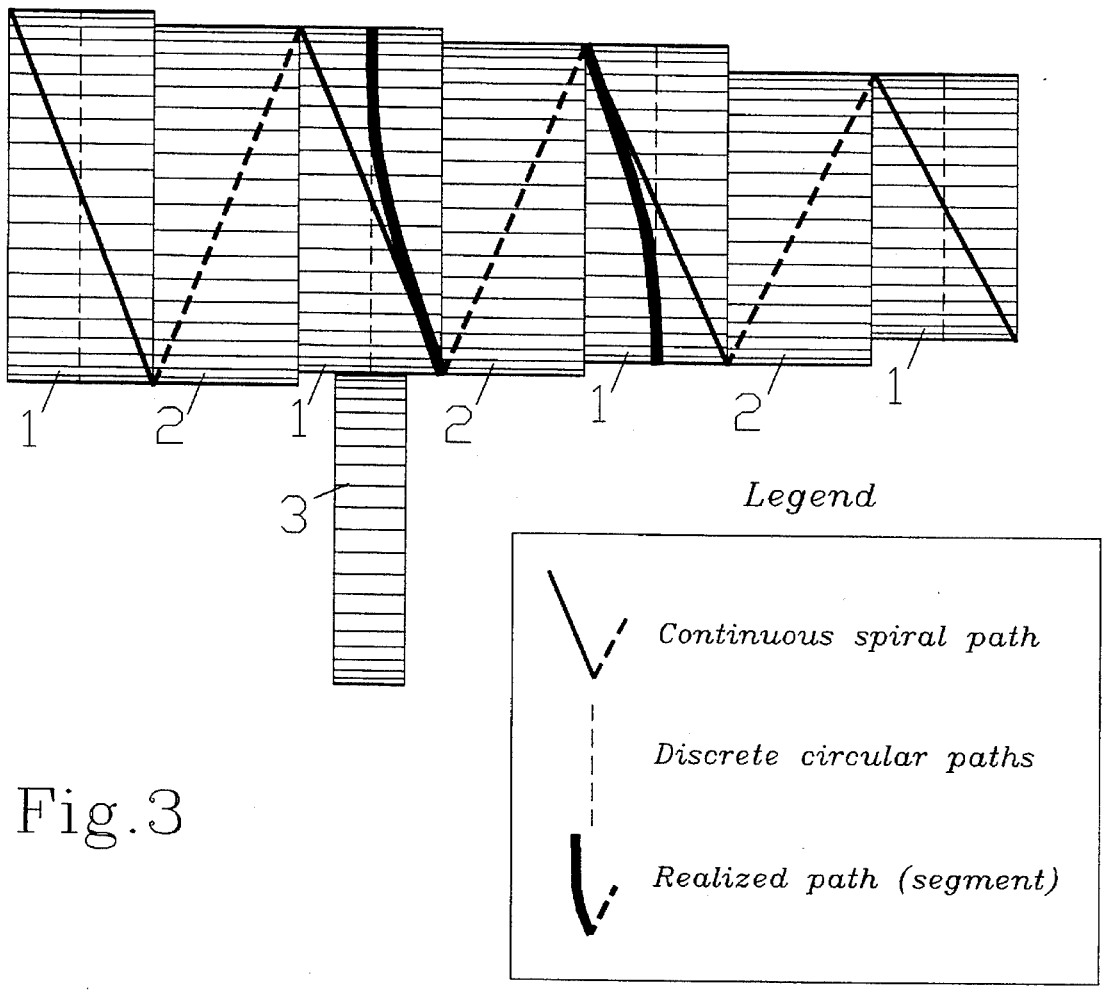

FIG. 3 shows the continuous spiral path which is possible when the intermediate shaft gears have twice the face width of the idler gear(s) 3. This configuration represents the long version. The ramp gears 2 provide a continuous pathway between the discrete circular paths of the running gears 1.

A plurality of shifting units (FIG. 2) combined serially as in FIG. 3 comprise the intermediate shaft which rotates as a unit on a fixed axis. The number of running gears 1 determines the number of speed ratios. If each successive speed ratio is to be within one shift position of the idlers 3, the number of speed ratios equals four times the number of ramp gears minus one. The intermediate shaft defines the semi-continuous subunit. When a semi-continuous subunit of three to five running gears 1 is combined with a dual range planetary gearset, a transmission with 14 to 30 different speed ratios results.

Figure 5A:
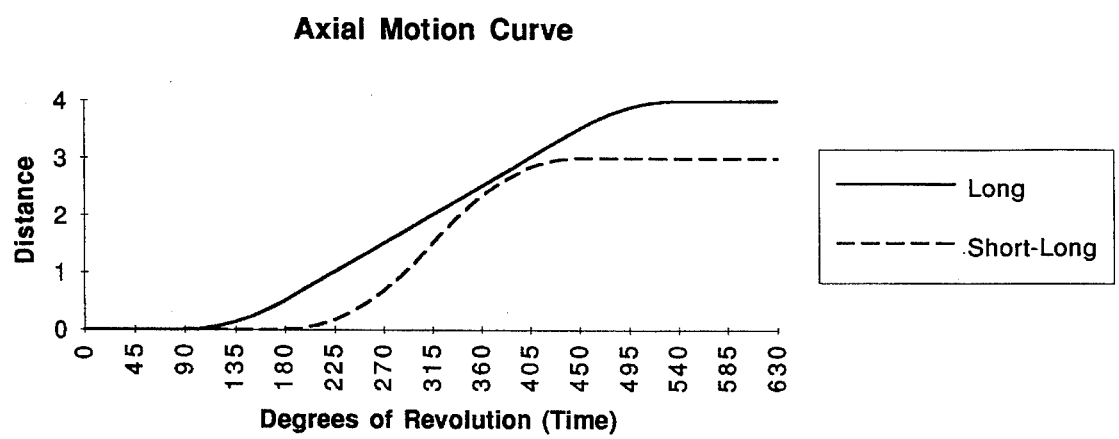
Figure 5B:
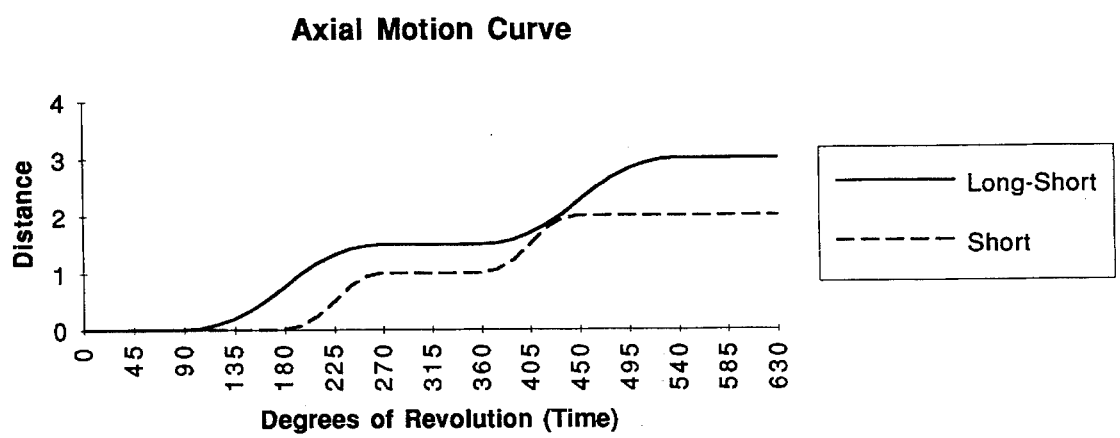

FIGS. 4A, 4B, 4C, and 4D depict four of the many intermediate shaft configurations for purposes of comparison. FIG. 4B and FIG. 4C represent especially favorable embodiments. To better understand the practical differences in these versions, FIG. 5A and FIG. 5B show the axial motion curves.

Wider running and ramp gears allow the idler 3 to get a smoother "running start" when shifting from a running gear 1 to a ramp gear 2 and from the ramp gear 2 back to the next running gear 1. This is important because the forces can be very high during high rpm conditions. Examination of the slopes of these plots gives an indication of the relative velocities inherent in each configuration. Examination of the points of sharpest curvature (second derivatives) of each of the plots gives an indication of the acceleration forces to be experienced with each configuration. The long version (FIG. 4A) wins in both regards; it has the longest run and it is not interrupted by having to pause on the ramp section. In all of these plots, on-loading occurs from 180 to 270 degrees, the ramp section of the ramp gear 2 is from 270 to 360 degrees, and off-loading is from 360 to 450 degrees. Any motion before 270 degrees or after 450 degrees takes place entirely on running gears 1. With spur cut gears, the face widths can be increased indefinitely without concern. With helical cut gears, a point is eventually reached where the ratio of the tangential velocity of the idler's teeth relative to the axial shifting velocity is no longer greater than the tangent of the helical angle. In such a case, the longitudinal sliding force used to move the idler would also be required to drive or retard the connecting shafts through the action of the idler's teeth.

Although the short-long (FIG. 4B) version has no opportunity for lead time acceleration, it still gives a favorable profile because it essentially does not have to slow down while passing over the ramp section. Even though these curves are based on uniform motion, and the underlying shapes are parabolic, the short-long curve depicted in FIG. 5A can be replaced by a sine curve or other more sophisticated curve suitable for high speed cams. But because a sine curve is a natural for the short-long version (FIG. 4B), this is the version most suitable for shifting longitudinally by means of a crank rather than by a shifting cam. The crank could be driven by a pair of gears with a 3:2 ratio so that 270 degrees (450–180) of required intermediate shaft rotation would correspond with half of a cycle (180 degrees) of crank motion. Crank motion can be very strong in driving the idler 3 like a piston, but for any single shift, motion in only one direction is required.

Figure 6:
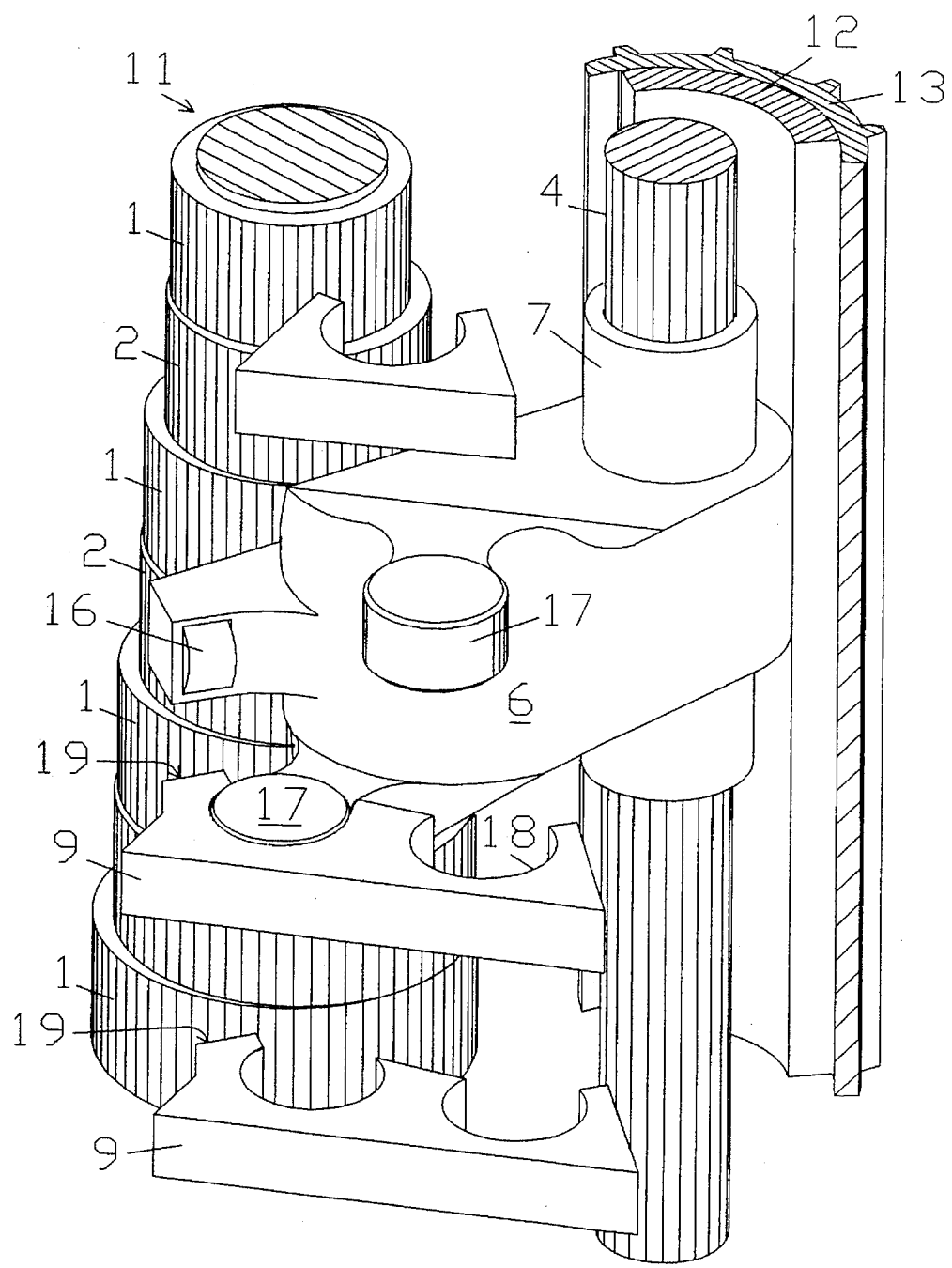
Figure 6:
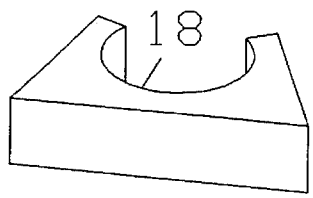
Figure 7:
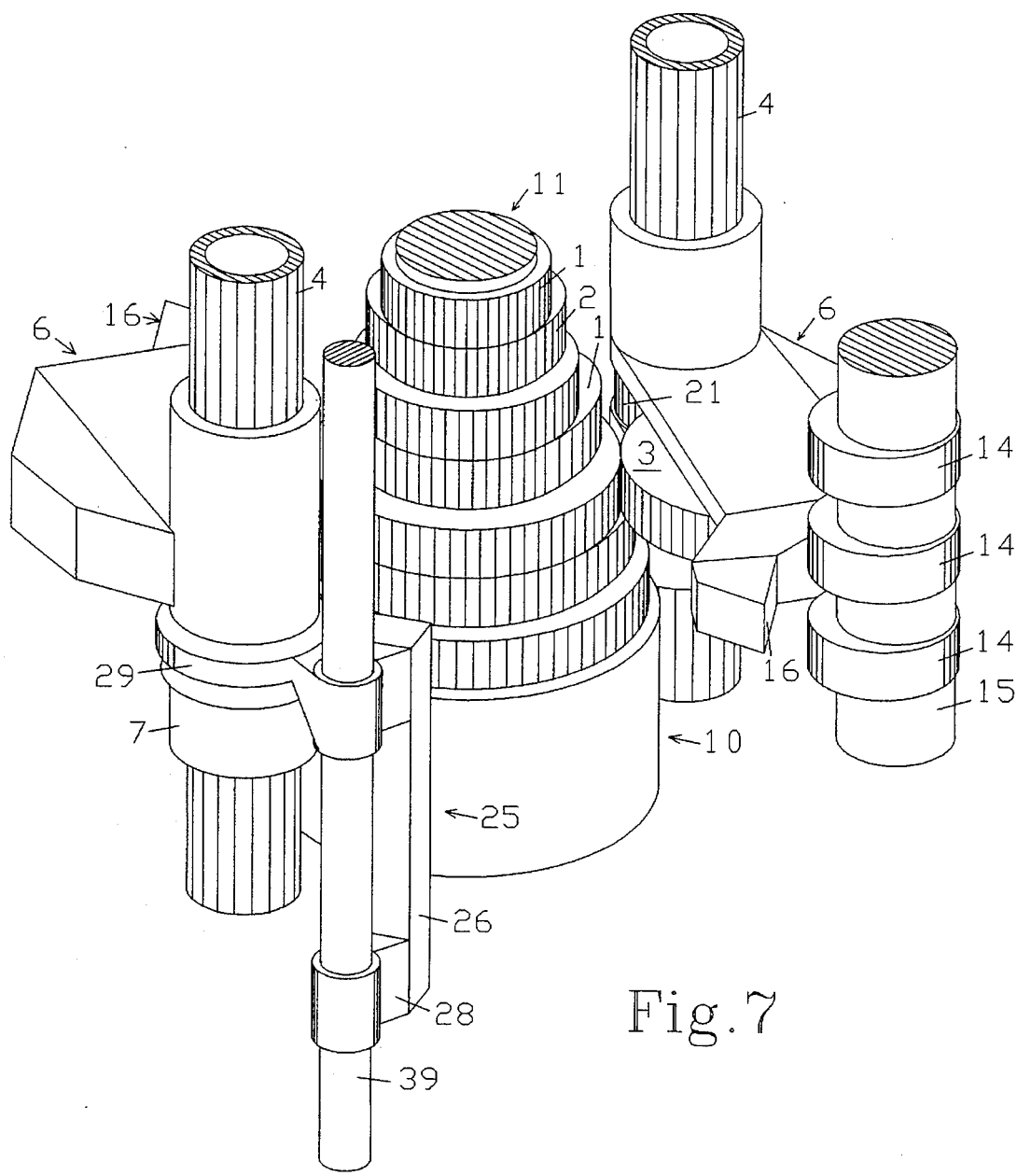
Figure 8:
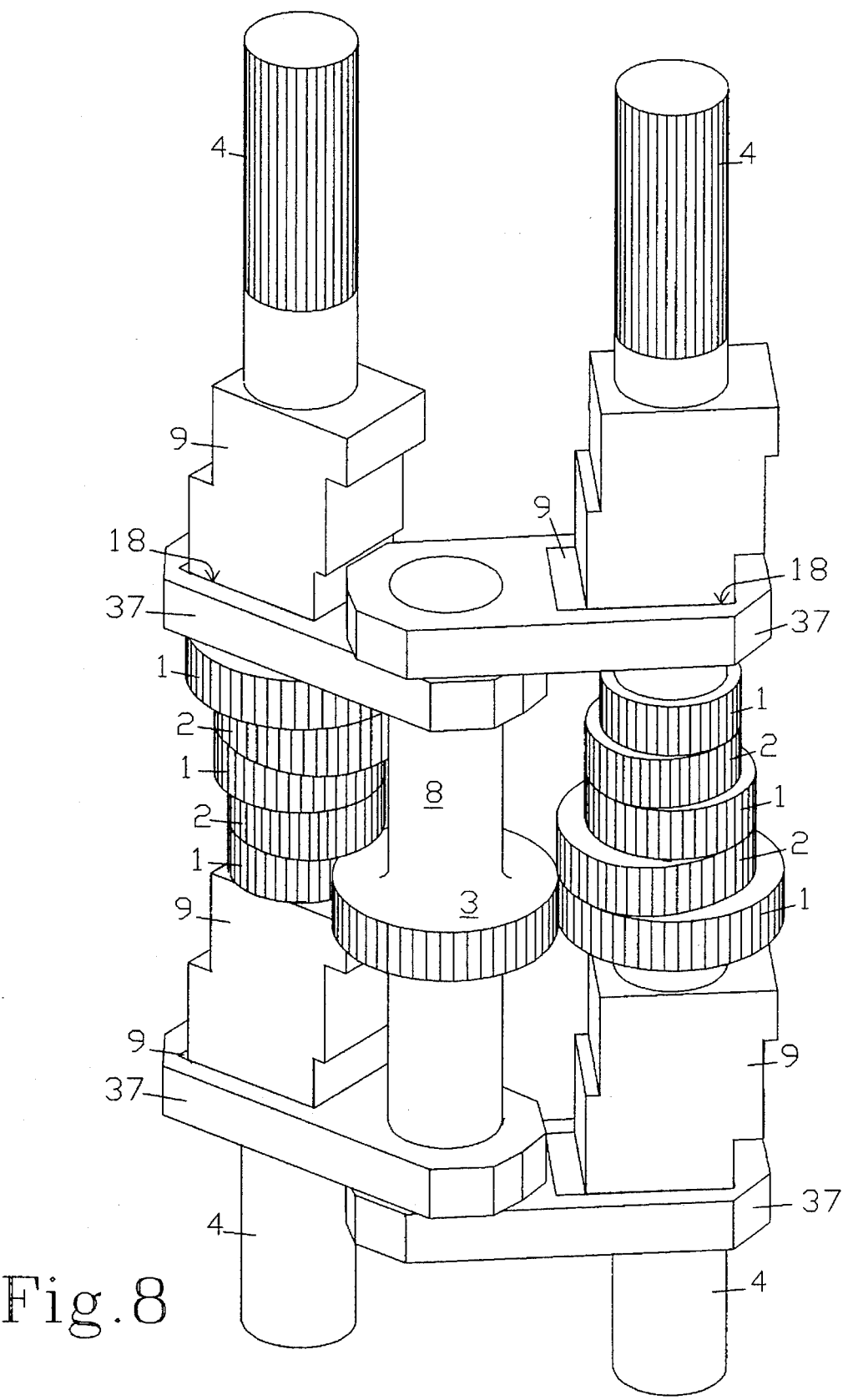

FIGS. 6, 7, and 8 show how the shifting units of the intermediate shaft relate to the other important components. Each figure depicts different arrangements with different advantages. In FIG. 6 only one of the two I/O shafts and idlers is depicted. This figure uses a long version intermediate shaft 11. The idler is hidden from sight since the view is especially intended to show the arrangement of the locking mechanism which is discussed later. A sliding, splined I/O gear (contained within the idler carriage 6 housing) moves in conjunction with the idler. Although the I/O shaft 4 is splined, the idler carriage 6 could still use smooth sleeves 7 to slide on its interrupted but smooth surface. If the I/O shaft 4 had continuous teeth along its length, the carriage sleeve 7 would be enlarged to clear the teeth and, in particular, the outside surface would seat against the external support 12 in the same fashion as the main body. This support 12, which is additionally supported by the transmission case 13 would, in that case, more completely wrap around the sleeves 7 than illustrated here.

Also for visual purposes, locking blocks 9 are shown as isolated pieces in space, and the block for locking the upper member of a pair of locking lugs 17 has been completely removed. In actuality all of these blocks form a unified structure joined along the edge of a positioning track 19. As the idler 3 moves up and down this intermediate shaft 11, a wheel provides a contact surface 16 which fixes the radial position as it rolls along the wavy and twisted track 19 which can only be partially indicated in this view. (FIG. 20 "long" shows the necessary profile. A slight, flat twist is introduced during the ramp sections due to swinging about the I/O shaft.) The only major component completely missing from this diagram is the longitudinal positioning apparatus. However this is essentially the same as shown in FIG. 7.

FIG. 7 shows a short version intermediate shaft 11 in relation to all of the other major components. In particular, a shifting fork 29 connected to a longitudinal shifting cam follower assembly 25 drives the idler 3 up and down the intermediate shaft 11. Grooves (not shown here) in the shifting cam 10 engage projections (not visible here) on the underside of the follower chassis 26. As the cam turns with the intermediate shaft, the follower assembly 25 moves the idler in perfect coordination. The same setup, or its functional equivalent, applies to FIG. 6. The main difference from FIG. 6 pertains to the three radial positioning cams 14 needed for this short version instead of the fixed positioning track 19 of the long version.

FIGS. 6 and 7 seem quite different, but the only fundamental difference is in the radial positioning control. The idler carriages 6 and locks are different, but these are interchangeable. A number of other idler carriage 6 and locking arrangements are presented later. If a layout of the short-long version were included, it would look very much like FIG. 6. Both actually have the two I/O shafts 4, idlers 3, idler carriages 6, and shifting apparatus of FIG. 7. If a layout of the long-short version were included, it would look very much like FIG. 7 with extra wide running gears 1.

FIGS. 6 and 7 represent the main embodiments detailed herein, but FIG. 8 is included to further demonstrate the key principles: ramp gears 2 and locking idler carriage 6. Briefly, this embodiment (FIG. 8) locates the stack of shifting units directly on the I/O shafts 4 which are splined on one end. These two shafts move independently and have their own independent, longitudinal shifting apparatus or cam (not shown). The I/O shafts 4 do not move radially. The idler 3 moves radially relative to the I/O shafts 4, but the idler 3 is fixed longitudinally. No radial positioning apparatus is needed. The I/O shafts 4 are spaced at an obtuse angle and rotate in a fashion to drive the idler into the gap. However the enmeshed gear teeth do not bottom out during normal running because they are correctly fixed in position by means of the pivotable locking blocks 9 and the idler shaft supports 37. Though rugged and simple, this embodiment is probably only suitable for low-speed operation since shifting entails moving not just an idler 3 but at least one I/O shaft 4 with a stack of gears and locking blocks 9.

I/O SHAFTS

Returning to the preferred embodiments of FIGS. 6 and 7, the I/O shaft 4 depicted in FIG. 6 could have gear teeth along its entire active length. Or, an alternate design could have an I/O gear 21 of the same width as the idler 3 and permanently engaged to it by restraining its position within the idler carriage 6. In such a case, the I/O gear 21 slides along a splined I/O shaft 4. This figure can be interpreted either way.

A full length gear is expensive but has advantages. Gear tooth wear is distributed. The idler gear 3 can slide readily in this configuration. Also, simultaneously sliding an I/O gear 21 would mean more weight and the carriage would have to be much heavier to prevent binding and jamming due to any slight axial misalignment. The combined shaft and gear has a large diameter which can be hollowed and yet remain very strong and rigid.

Using a simple sliding I/O gear 21 on a splined shaft is a less expensive proposition and reduces the overall weight somewhat. If a helical I/O gear is used though, there must be a means to firmly lock it in place to control the unbalanced thrust forces. During shifting, these forces are momentarily alleviated if a clutch is used.

The two I/O shafts 4 can be oriented at any relative angular separation providing enough space, but their idlers 3 normally must be disposed on the same relative side so that both idlers 3 can share the same shifting cam 10. This restriction does not apply if there is no need to phase shift the ramp gears 2 progressively.

One preferred location for the I/O shafts 4 is as close to the intermediate shaft 11 as possible. This marginally diminishes overall dimensions when combined with a small idler 3. This position also minimizes the torque couple from the intermediate shaft 11 and I/O gear 4 when helical teeth are used. But if a small idler 3 is used, this advantage is defeated. A sizable idler 3 gains little by squeezing the I/O shaft 4 near the intermediate shaft 11, and a reasonably sized idler 3 about the size of a mid-range running gear 1 is suggested. Such an idler 3 mounted at roughly right angles to the I/O shaft 4, will need little if any phase compensation. Phase relationships in this case refer to the angles formed by the different contact points of the idler 3 with respect to the intermediate shaft gears 11. Increasing the separation distance between the I/O shaft 4 and the intermediate shaft 11 beyond that which forms a right angle with the idler causes increasingly severe phase/angular changes as the idler 3 swings between gears. This should be avoided.

If significant phase changes occur as the idler 3 swings from the largest to smallest gears, then compensation is needed. The correction is simple. To compensate, the ramp gears 2 are individually rotated so that the idler 3 always rests in the center of the ramp section of the ramp gear 2 when the shift cam 10 is at the midpoint of its ramp shift cycle. This will split some slight residual error between the on-loading and off-loading sections of the ramp gear 2 so that top dead center of the ramp gear 2 no longer exactly corresponds to zero degrees on the shift cam 10. And, bottom dead center of the ramp gear 2 no longer corresponds to 180 degrees. But this residual error is usually insignificant. If there is still not sufficient leeway in the timing, then an asymmetrical ramp gear 2 is required. However, any design calling for asymmetrical ramp gears 2 deserves reexamination. No such embodiments are detailed here. Some additional leeway in the timing is also possible by reducing the width of the idler(s) 3 relative to the running gears I and ramp gears 2.

IDLER GEAR AND IDLER CARRIAGE

A variety of idler carriages 6 are shown in FIGS. 9, 10, 11, and 12. Each style has specific advantages. The idler carriage 6 largely encloses the idler 3 and transforms it from a "floating" gear to a fixed gear. Shift impulses act on the carriage 6 directly and on the idler 3 indirectly. The generous usage of light alloy materials and the use of box or geodesic construction can help make low weight, rigid carriages 6. Attention to the detailed design of the idler 3 and its carriage 6 is the key to building a successful unit. More sophisticated designs than the crude examples displayed in the figures are recommended.

A separate sleeve 5 can surround the elongated I/O gear shaft 4 upon which or around which the idler carriage 6 can be concentrically mounted. A slot must exist in such a sleeve to permit the engagement of the two gears' teeth if the I/O shaft 4 has continuous teeth. This support can act as an internal support sleeve 5, or it can be a structure to act as an external sleeve 12. An external sleeve 12 is potentially much stronger and is easier to mount. The strong driving and separation forces between the idler 3 and the I/O gear 21 are contained by the frame of the idler carriage 6. However the driving and separation forces between the idler 3 and intermediate shaft 11 are partially redirected through the idler carriage 6 to the I/O shaft 4. The easiest way to nullify these deflection forces on the elongated I/O shaft 4 is to include an external support sleeve 12 to couch the idler carriage 6. Any forces pushing against the carriage are transmitted instead to the external support. External forces from the carriage locking mechanism, to be discussed below, would also be transferred to this support rather than to the I/O shaft 4 or gear 21. External supports and internal sleeves 5 about the I/O shafts are discussed below.

If the spline flanges are very broad, a sufficient surface can remain on which to smoothly slide the idler carriage 6 directly. The idler carriage would require heavy-duty bearings in order to endure the constant turning of the I/O shaft 4. An external support 12 allows the idler carriage 6 to slide along its circular exterior.

An external support 12 does not have to have a smooth surface. Its surface can have grooves or protrusions which mate with complementary structures on the idler carriage 6. Then, when the carriage slides longitudinally, these surfaces can act as guides or cams to help rotate the idler carriage 6 into its new position. Also various structures can be employed as locking devices. A properly designed idler carriage external support 12 combined with a full complement of locks could, in principle, position the carriage so that no contact with the rotating I/O shaft 4 is necessary.

The idler shaft 8 on which the idler 3 turns can be free or rigidly fixed to the carriage or to the gear. The carriage 6 is primarily fixed about the I/O shaft 4 axis and rigid extensions about its attachment prevent movement in all directions and modes except for rotation about the shaft's axis and longitudinal sliding along the shaft's axis. A central feature of this transmission is its ability to almost instantly move the idler 3 from one running gear 1 to another yet hold the idler 3 very firmly in place when it is transmitting power. This ability to lock the idler 3 in place is dependent upon the carriage's 6 design.

Figure 9:
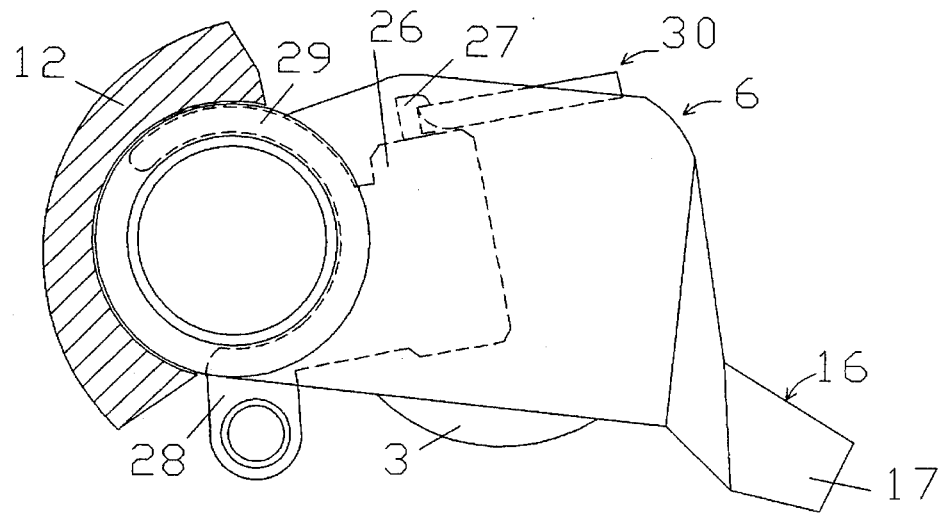

FIG. 6 showed an idler carriage 6 with locking lugs 17. These engage locking slots 18 when in the running position and assure precise alignment. They counter both separational and torsional forces. FIG. 9 shows a fixed lock as integral to a one-piece design. The projecting lug 17 acts not only as the locking piece, but also functions as a follower surface upon which the radial positioning cam 14 works (FIG. 7). This style is strong and is compact because a radial positioning cam 14 can run near the surface of the intermediate shaft (long-short version—FIG. 4C, and short version—FIG. 4D). This geometry creates a lever action which mitigates gear tooth tolerances. Movements at, or adjustments to, the locking plates are about twice that realized at the idler gear's teeth. The location of the radial positioning contact surface 16 could instead be anywhere along the top border where movements or adjustments will have approximately a one to one relationship with gear tooth positioning.

Figure 10:
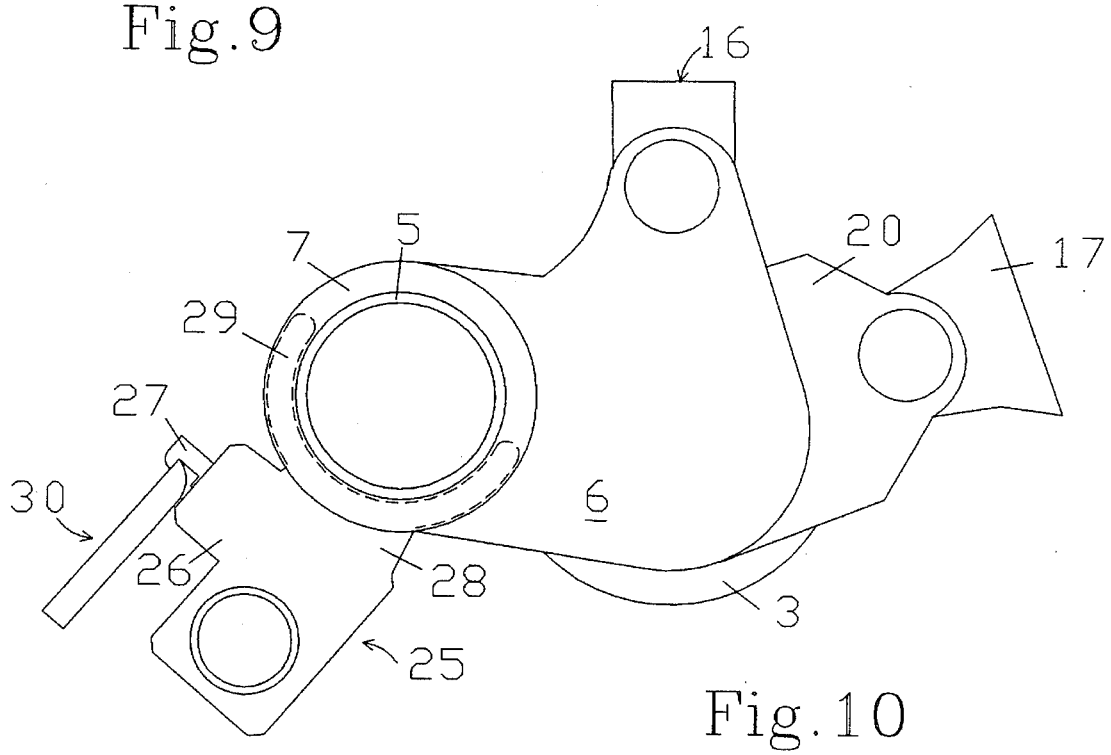

FIG. 10 shows a 2-piece idler carriage 6 with the locking half 20 pivotable about the idler gear 3 axis. The advantage of this design is that the linkage will be free during shifting, but when locked, while transmitting power, it will experience a very strong jamming action as the idler 3 is pushed upwards. This then forms a solid mount which becomes naturally stronger as transmitted power increases. The forces approach infinity as the included angle approaches 180 degrees. However, the tolerances for the lock are now much more exacting with regard to the final locking position. The external support 12 indicated in FIG. 9 is actually much more important for a two-piece carriage. However the longitudinal shifting assembly 25 would have to be repositioned or reshaped. These figures are also meant to demonstrate the variety of positions in which the shifting apparatus can be oriented. The radial positioning contact surface 16 is centered so that it does not have to work against a mechanical disadvantage.

Figure 11:
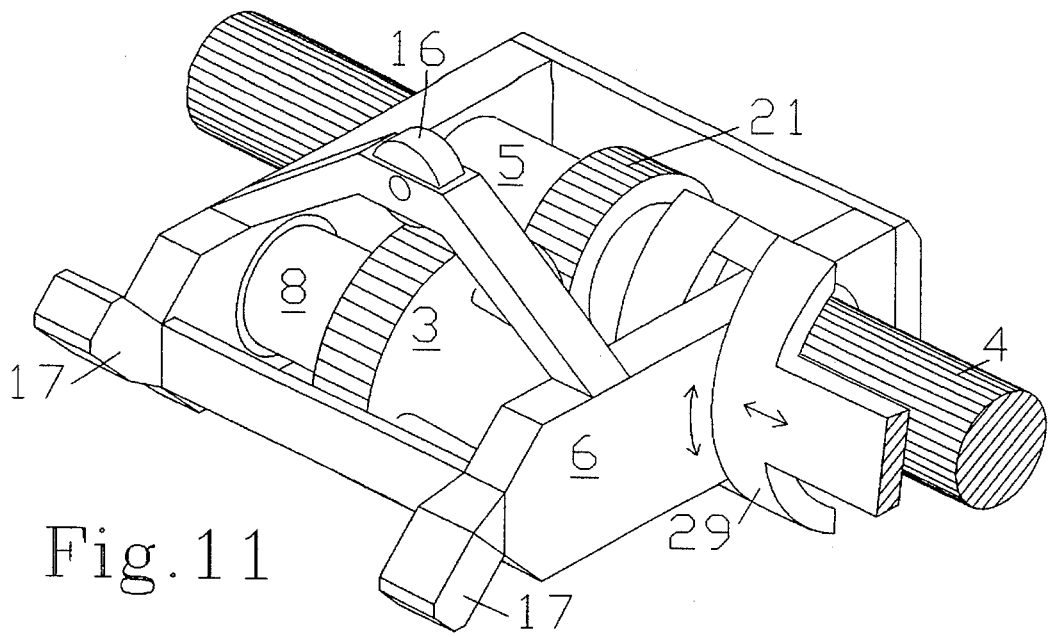
Figure 12:
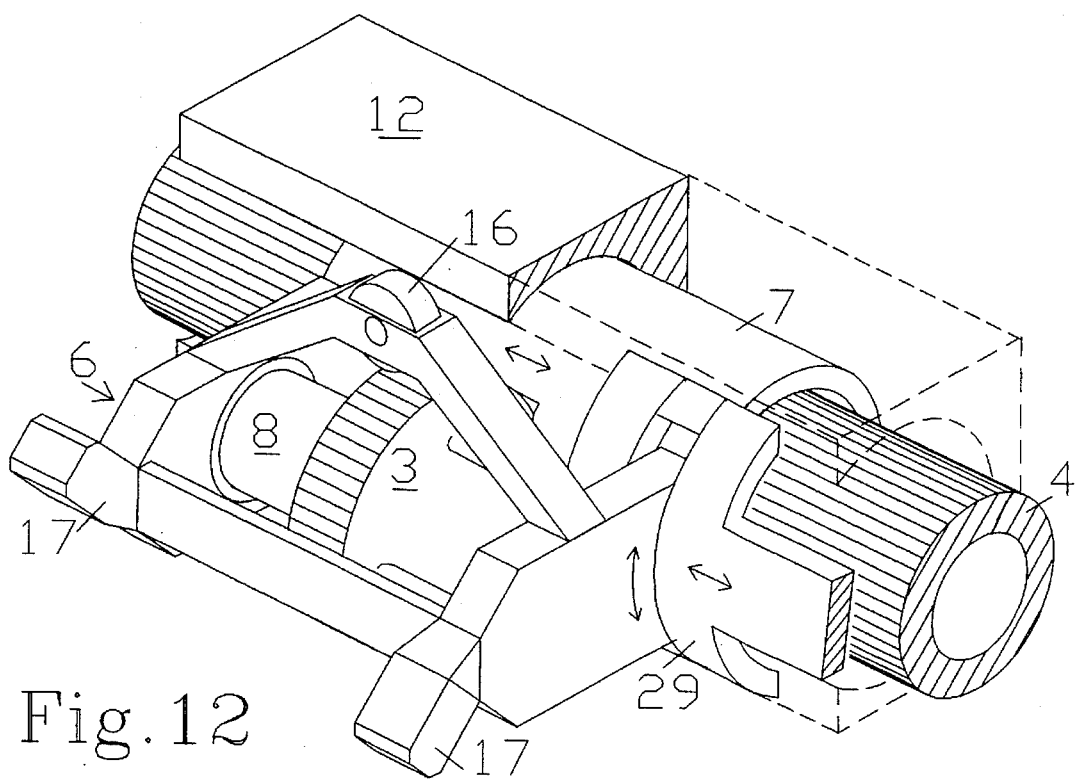

FIGS. 11 and 12 show sample idler carriages 6 for a short-long version intermediate shaft 11. In the first figure a sliding I/O gear 21 is used and the carriage connects directly to the I/O shaft 4 with the sleeve 5 now used primarily to keep the I/O gear 4 centered. FIG. 12 is the same except that the I/O shaft 4 has continuous teeth and the carriage 6 pivoting structure is the external support 12. These two figures show logical ways to configure the carriage for a sliding I/O gear 21 and for full length I/O gear/shaft 4, but it is possible to use an external support 12 with a sliding I/O gear 4 and an internal sleeve 5 for the carriage with a full length I/O gear 4. Though the design of FIG. 12 has fewer parts, it may be even more expensive to manufacture. During running, this design has no extraneous moving contact surfaces.

Locking Mechanisms

Returning to FIG. 6, this best shows the organization of locking lugs 17 and locking slots 18. The top-most and bottom-most locking slot sets are unitary because only one lug 17 reaches these extreme positions. At all other positions, either of the paired slots 18 may be engaged. Several slots have been omitted for illustrative purposes. The locking lugs 17 can be of various shapes and can have splines or smooth surfaces.

The lugs 17 are the same width as the idler 3 and the locking slots 18 are positioned at the mid-points of the running gears 1. When the idler 3 is centered on a running gear 1, it is locked. During shifting it initially moves parallel with the slot during its on-loading movement to the ramp gear 2 and during this time it slides out of its lock. It returns in a similar fashion. In some applications these locks may be superfluous.

One criticism of floating gear shifting mechanisms is that they are subject to vibration and therefore unsuitable for large torques. This transmission solves that potential weakness by three different means. The first ameliorative feature is the use of helical gears which intrinsically reduce noise and vibration by their increased contact ratio. The second is to use the rigid locks indicated. Finally, running the idlers 3 in the opposite direction of the usual, textbook direction surprisingly accentuates the effectiveness of the locks and results in very smooth operation.

Traditionally a floating gear is set into place and perhaps held there with the aid of spring tension. In fact, such an arrangement is also one of the classical arrangements to eliminate gear backlash. The gear is always driven in a direction which tends to help hold it in place. Running it in the opposite direction will cause it to "hop" out. Normally this is bad. But what causes vibration in this anti-backlash scheme, or shifting scheme, is that the teeth are always "bottoming out." Running the idlers 3 in the reverse sense of the natural direction is possible with these locks. This actually helps the locks to eliminate vibration. In this backwards mode, even a simple, unarticulated lock will experience tighter and tighter forces as driving pressure on the idler 3 increases. The main driving force and the secondary gear separation forces work in conjunction instead of being antagonistic. During the shifting pulse, a clutch can momentarily relieve almost all of this pressure. But once the lock is reset and the running gear 1 is transmitting power, these strong forces instantly reappear. This locks the lock. The teeth have proper clearance and they are held extremely firmly so vibration is minimized. In actuality, carefully machined locks prevent "bottoming out" and vibration in the normal direction of rotation too, but the locking force is then a function of the difference between the driving force and the separation force rather than their sum.

The locks in FIGS. 6, 11, and 12 not only gain stability by opposing the driving and separation forces, they also act as anti-torsion locks. The anti-torsion lock lugs 17 are located on or near the twisting axis of the idler 3 if helical teeth are used. The thrust vectors due to helical teeth are parallel to the idler's axis and are equal and opposite. While this nullifies axial thrust, they form a torsional couple. The twist axis is oriented along the bisection of the angle made by the idler's contact with the I/O shaft gears 4 and the intermediate shaft gears 11. The greater the separation of the contact points of the idler 3 with the I/O gear 4 and the intermediate shaft gear 11, the greater the couple's moment. These locks materially assist the carriage's support extensions in preventing torsional distortion of the idler's alignment. Tilting of the idler 3 would produce end loading of the teeth and a reduced contact ratio which would contribute to noise. The locks give the means to control axle slope, tooth alignment, and clearance.

These lugs 17 have the same width as the idler gears 3, as do all the locking lugs, and they are minimally separated by the ramp gear's width. The locking slots 18 have the width of the running gears 1, which, if desired, permits extra deep locking slots with the long and long-short versions. A single lock (FIGS. 9 and 10) aligns only with the current running gear's position. Doubled anti-torsion locks (FIGS. 11 and 12) align with the next and the previous running gear positions. Being three "spaces" apart and offset, there is no interference when one lug 17 occupies the same plane as the opposite lug 17 previously occupied. Separate slots 18 in the locking plates accommodate the right and the left lugs. Other spacing arrangements are possible.

SHIFTING
LONGITUDINAL MOVEMENT

Figure 13:
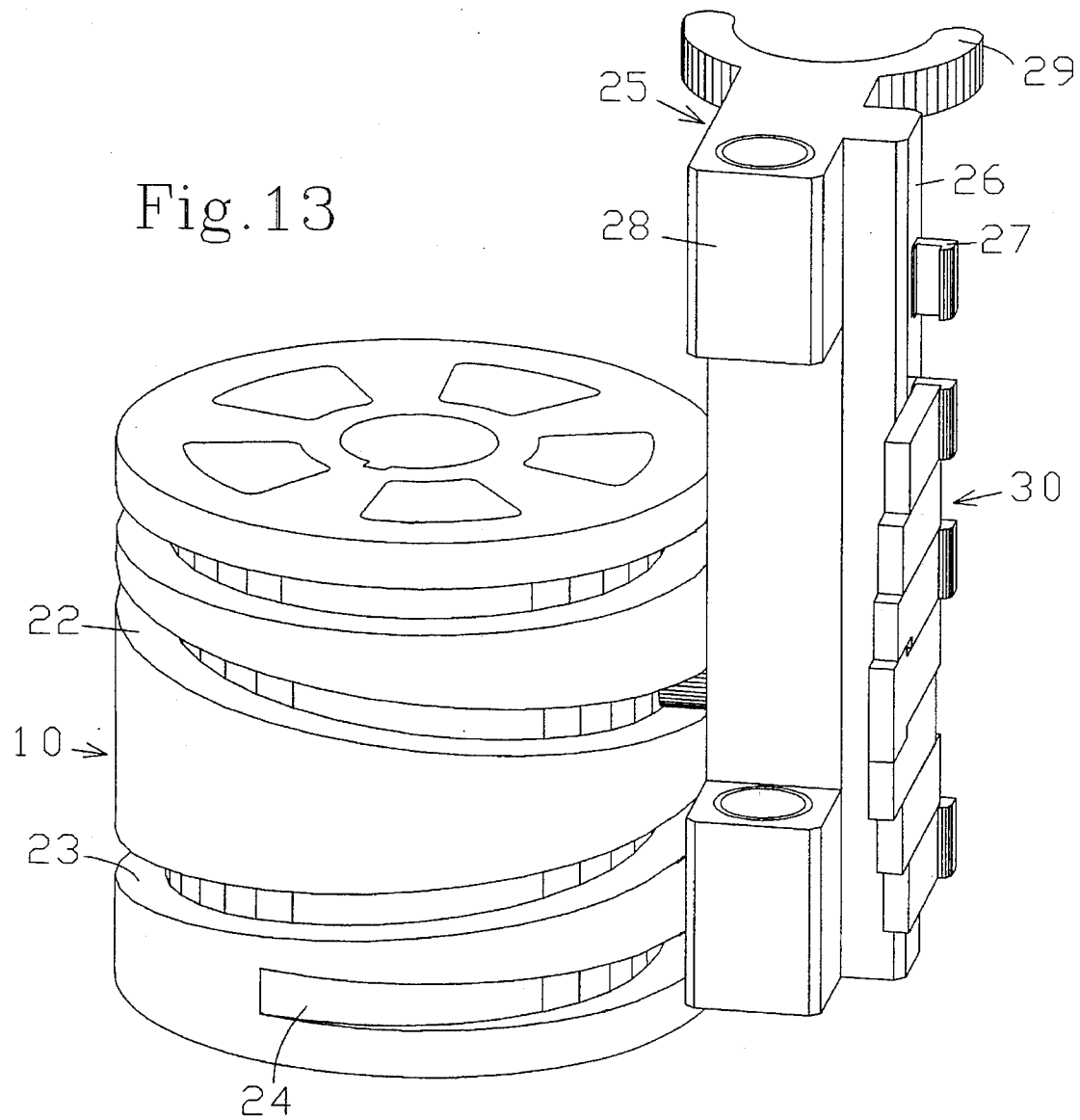

FIG. 13 shows one possible longitudinal shifting assembly. This is comprised of two grooves on the cam cylinder. One groove (cam) moves the idlers 3 toward the small end. This is arbitrarily called the downshift cam channel 22 for convenience. The counteracting groove is termed the upshift cam channel 23.

The shifting cam follower 25 which links the shifting cam 10 to the idler carriage 6 can quickly select whichever shift channel is appropriate. This is accomplished by activating a follower pin 27 which temporarily lowers into the appropriate channel. When a pin 27 is extended, the revolving cam 10 pushes the follower chassis 26 which has a support arm 28 connecting it to the follower support shaft 39 (FIG. 7) upon which it moves up and down. It is rotationally fixed on this shaft by a shifting fork 29 which is mated to the idler carriage 6. A single shifting fork 29 will suffice if it is fixed so that it can push or pull. The fork 29 can be omitted and the follower chassis 26 can be included as a unified extension of the idler carriage 6 if means are provided to allow the idler carriage to swivel freely. The follower chassis 26 can also have an extension attaching it near the center of the idler carriage 6. This gives the pushing motion a favorable vector, but this attachment must also allow the idler carriage 6 to swing freely. Many arrangements are possible.

Figure 15A:
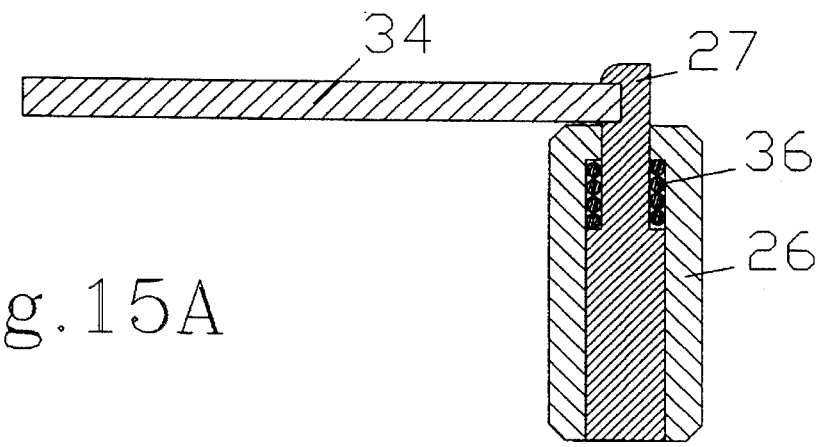

The profile of the shifting cam channels depends upon whether single or double-width gears are used on the intermediate shaft 11. In any case a shifting pin 27 is gradually lowered into the channel during one-quarter to one-half of a revolution of the shifting cam 10. After shifting, the cam channel exit 24 pushes the pin 27 back up into the follower chassis 26 where it is locked in an inactive position (FIG. 15C). This also encompasses about one-half of a revolution. Specific channel profiles are discussed below.

Control of Cam Follower Pin Deployment

Figure 14:
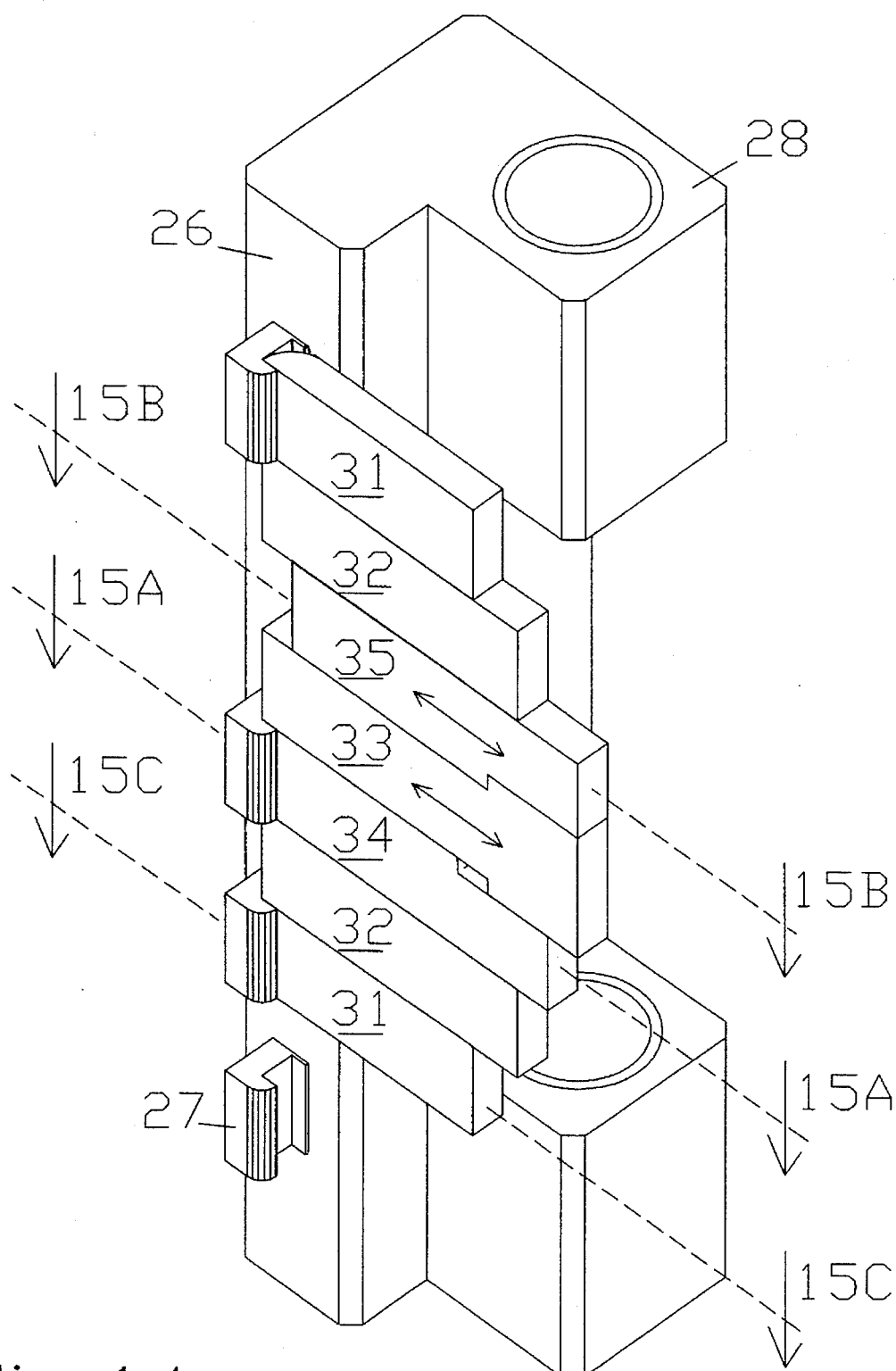

FIG. 14 provides a clearer view of a mechanism for longitudinal shifting. Normally all of the follower pins 27 are locked inside the follower chassis 26 where they are inactive (FIG. 15A). As all of the follower pins 27 have compressed springs 36, the top of each pin has a catch which engages a locking key 30.

Figure 15B:
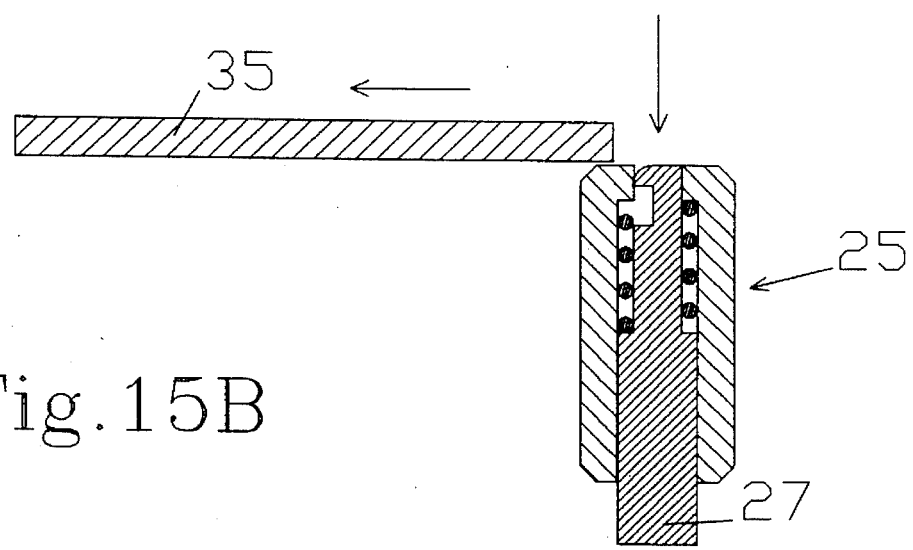
Figure 15C:
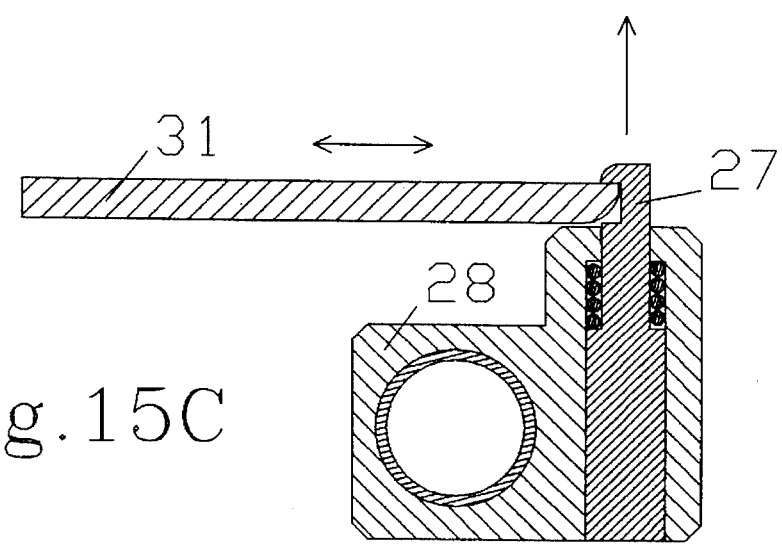

When a downshift is required, the downshift release key 34 is retracted (FIGS. 14 and 15B). Pulling this key, or the upshift release key 35, also automatically pulls the axial locking key 33. This locking key 33 is longer than the other keys and does not retain a follower pin in the inactive mode. Instead it fits between two shifting pins 27 and prevents their axial movement while in the running or inactive mode. Activating either shift key simultaneously disables this spring-loaded lock. The shift release key 34 or 35 is kept pulled back until the follower chassis 26 begins to move. This movement means that the shift pin 27 which was not released has now engaged the axial locking key 33. This prevents the locking key 33 from moving back into place until the shift cycle is completed. It will automatically snap back into place when the shift cycle is completed. All of the inactive pins slide continuously from one key to another so they are never activated. The fixed keys 32 never move; they only restrain the pins.

The return keys 31 on the ends are also spring-loaded, and they serve to automatically re-engage the shifting pin 27 in its inactive position at the end of the cycle (FIG. 15C). Only these end keys need a curved surface to allow the pin to return as the cam's channel becomes progressively more shallow, forcing the pin back up. The channel's end actually has a small blip slightly higher than the main cylinder 10 surface to reset the pin. The protruding foot of these pins can be fitted with a rolling cap. This cap may not have time to accelerate enough to achieve rolling contact, but it should still distribute wear.

Everything is activated by momentarily pulling only one of two retainer keys. Beyond these seven primary keys, the means to retain the pins in their retracted, inactive state depends upon how the follower chassis 26 is placed. If the follower chassis 26 is configured as in FIG. 7, then extended shelves much like the fixed pins 32 (FIG. 10) can be employed to always keep the pins drawn in.

FIG. 9 shows a more favorable placement of the follower chassis 26. This permits a more direct pushing and pulling action on the idler carriage 6, and it is more compact. However, in FIG. 9 a fixed shelf is only possible on the side of the cam cylinder opposite the idler 3. On the idler side, a means is needed to drive the pins in to their inactive position as they approach the edge of the cam cylinder. One means is to provide a large chamfered rim on the cam cylinder itself which drives an approaching pin upwards to a height sufficient to engage a fixed wedge which finishes raising it to the level necessary to smoothly slide it onto the main set of keys. Another means is to have extended necks on the pins so that the level of their catches and the keys and shelves on which they run are positioned out of the range of potential interference. Also the pins could self-lock when they are reset to the inactive position, and the pins could instead be released by being pushed off their internal locks during triggering. Many arrangements are possible.

Figures 16A, 16B, 16C:
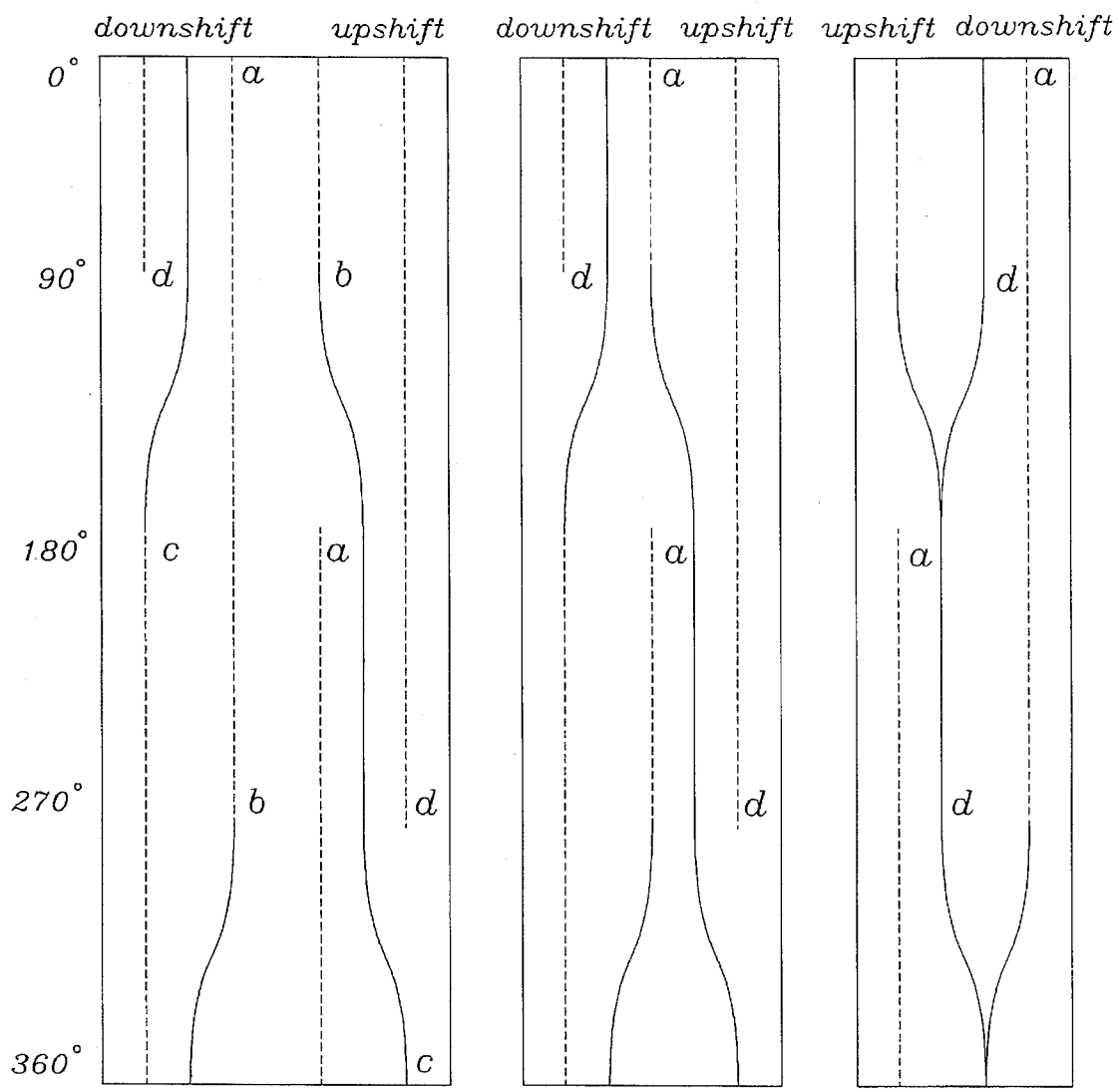

With totally independent upshift and downshift cams (FIGS. 13 and 14), the number of pins 27 in the cam follower 25 equals the number of running gears plus one. (An exception is a minimal unit with only 2 running gears where only two pins are double spaced.) The spacing of the pins 27 is identical to the spacing of the running gears 1. Therefore the overall length of the transmission subunit approximately equals the length of the intermediate shaft 11 plus the length of the cam assembly. A dual cam cylinder with fully independent tracks is about the width of four running gears 1 so there is little savings in length by using only two running gears 1. Using three, four, or five running gears (the range of the most practical values), does not result in proportional increases in overall length. Five gears are only slightly bulkier than three, but more than double the possible speed ratios. FIGS 16B and 16C show how more compact cam configurations can be devised.

Comparison of Long and Short Versions

FIG. 16A shows the standard shift pattern described above for a short version subunit. For either a downshift or an upshift, the pin 27 is triggered at point a. It lowers into the channel fully by point b. It then shifts onto the ramp gear 2 during the next 90 degrees, dwells for 90 degrees (radial movement on ramp), and moves off the ramp in the next 90 degrees to finish the shift cycle at point c. The pin is reset to its inactive position during the next 270 degrees by point d. There is a 180 degree phase shift between the downshift and upshift profiles. This is a function of whether a down ramp or an up ramp will be encountered since they are on opposite sides on the ramp gears 2. FIG. 16B shows how a shortened cam cylinder can be achieved. Here only one shift pin 27 exists. There are two point a's which will initiate shifts. These are 180 degrees apart, and the timing of a pin's release determines its channel. The third panel show an even greater reduction. Two shift pins are used again, but their spacing is altered and they share a common channel. The apparent difficulty of drawing the pins out of the dwell channels by point d (so that they do not continue to cycle), can be solved by using asymmetrical tips on the pins and asymmetrical exit ramps within the common channel zone. There are now two types of pins which alternate with close spacing on the follower chassis 26, so this is possible. One common dwell channel expels pins with upshift asymmetry; the other ramps out all downshift-shaped pins.

Figure 17:
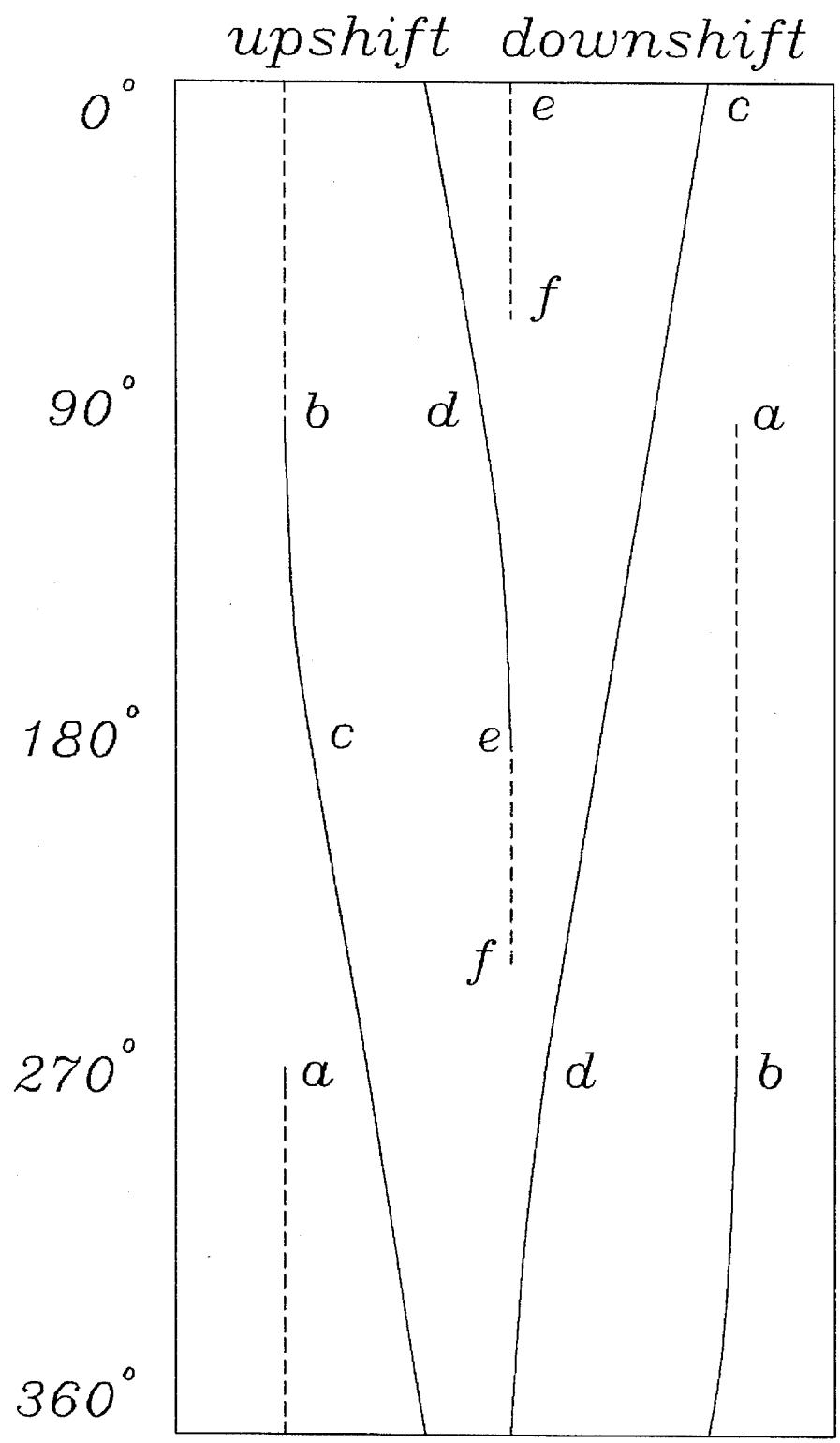

FIG. 17 shows the profiles which would be used with a long version subunit. Again this is reminiscent of the profiles shown in FIGS. 5A and 5B. FIG. 13 shows two long version cams which are completely independent. FIG. 17 shows how the cam can be made smaller by overlapping the exit positions, points e to f. Again point a is the site of initiation, point b is the beginning of acceleration on the running gear 1, point c is the beginning of the ramp gear 2, point d is the end of the ramp gear 270 degrees later, points d to e are the deceleration zone onto the next running gear 1. With a full width cylinder, points e to f do not overlap and can be greatly extended.

Alternative Configurations

It is possible to trade off length for complexity to achieve a more compact design. The illustrations and descriptions above relate to serially positioned shift cams 10. They can instead be arranged parallel to the intermediate shaft 11. This might save a little space with a very long intermediate shaft 11 composed of many gears. Separate gears must drive these cams. The idler carriage 6 must still have four pins corresponding to four running gears 1 if the cam channels are to have the full two and a quarter revolutions (810 degrees) available for both directions (like the serial cams). Two parallel cam shafts can be used for each idler 3. One provides a series of downshift cams and the other a series of pushing cams in a fashion similar to a worm gear. In this case only a single pin is required to engage either cam shaft and full-length savings always obtain. However this scheme tends to be self-defeating because of the increased bulk in the width. Both cam shafts must avoid interference with the idler 3 and yet have large enough diameters to achieve favorable cam pressure angles. One way to reduce bulk would be to run the cams with smaller end gears at perhaps a 3:1 ratio and require six cam revolutions (3×720) per shift cycle.

Another "short" design employs a disk cam turning synchronously with the intermediate shaft but mounted on a perpendicular shaft through a pair of bevel gears. Such a cam's follower consists of a series of stairstep structures fixed to a cage connected loosely to the idler carriage. Although these schemes and many others are workable, further discussion is unwarranted.

There is little or no length savings realized unless the number of running gears is large. If purely mechanical means are chosen, total volume, weight, and simplicity is likely to be better with the serial arrangements illustrated. Shift systems designed to work primarily with hydraulic or solenoid means, for example, may be more compact.

RADIAL MOVEMENT

As with the control of the longitudinal movement of the idlers 3, the control of their radial movement can employ one of the elongated configurations or one of the shortened configurations. The elongated schemes are the simpler. But the more complex, compact schemes pay other dividends.

Elongated Versions

Figure 20:
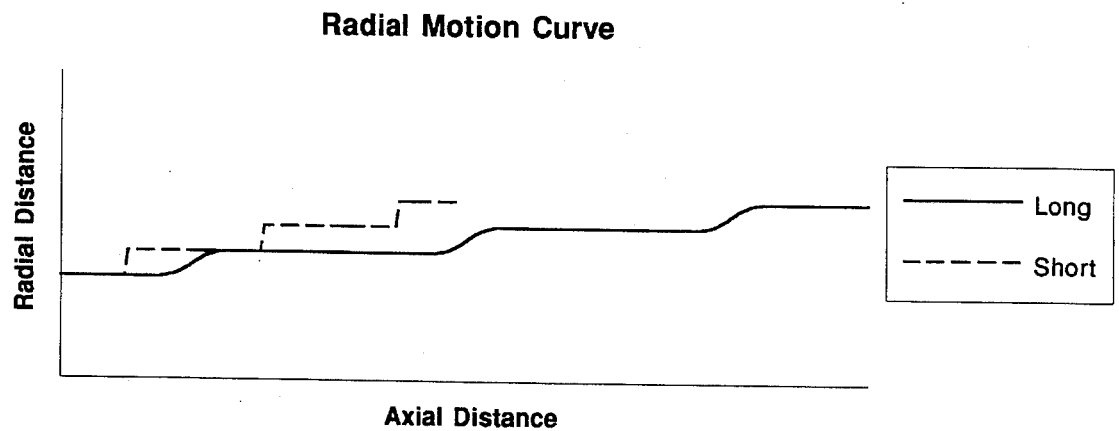

FIG. 6 showed a long version subunit. The contact surface 16 for radial positioning in this case is a wheel (also short-long version, FIG. 12). The wheel travels in a track 19 not demonstrable in the view. Two short segments are indicated. Between these there is a fixed track composed of ramping sections which correspond to the ramping sections at the same level on the intermediate shaft's ramping gears. Between these sections are straight sections which are three times as long as the curved sections. The straight sections have no twist within the individual sections, but the ramp sections between them have a slight twist. FIG. 20 (long version) gives the best indication of the shape of this track. The steepness of the curved sections of the track is dependent primarily upon the changes in the diameters of the running gears 1 and the location of the contact surface 16 (wheel) on the idler carriage 6. The radial movement plot of the short-long version would look just like the long version in FIG. 20 except that the straight segments would only be two-thirds as long.

Short Versions

Figure 18:
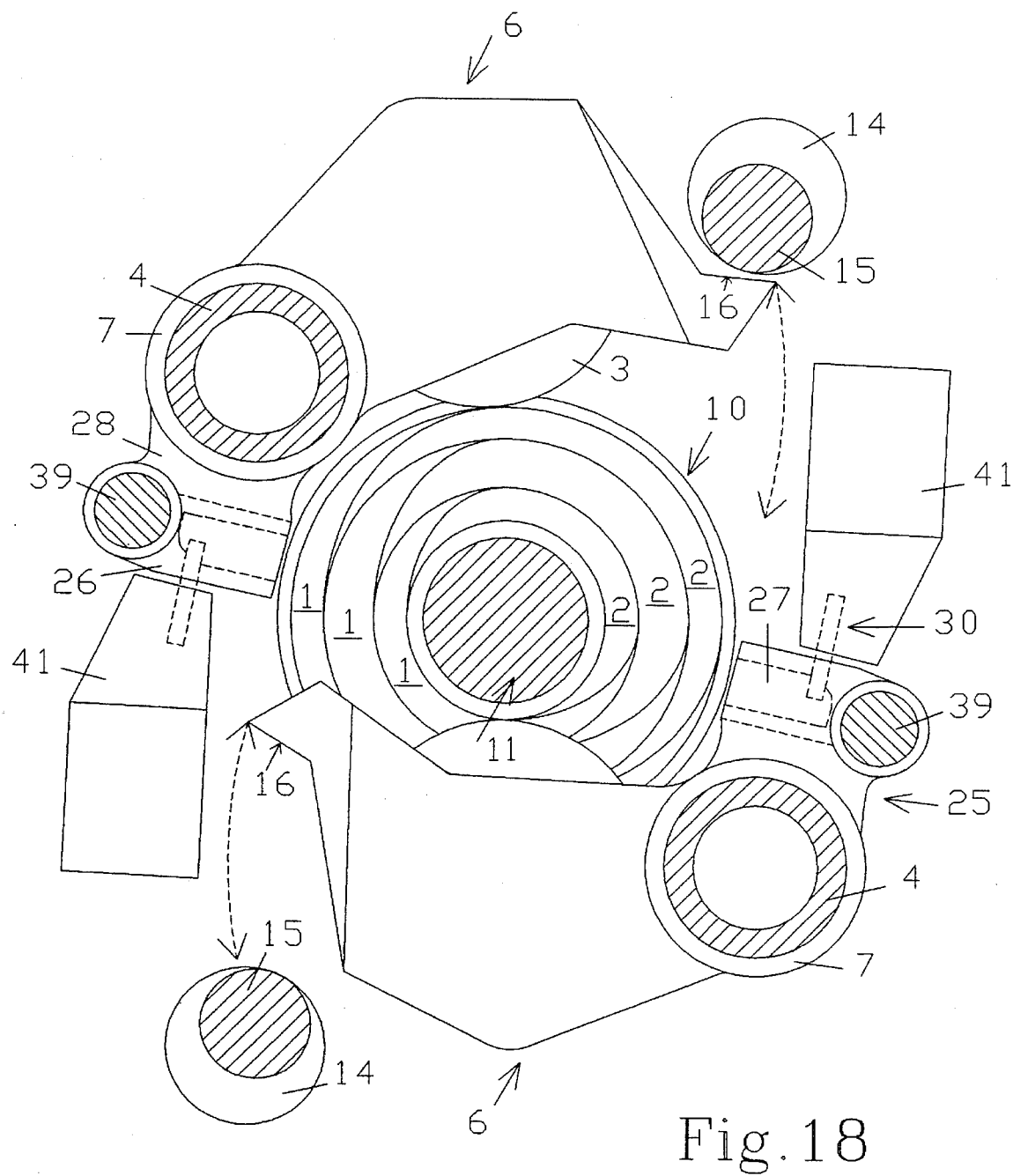

FIG. 18 shows an end view of a subunit equivalent to that shown in perspective in FIG. 7. "This could also represent a long-short version. Without the radial positioning cams 14 and cam shaft 15, it could also represent a short-long version or a long version (FIG. 6)." This end view also includes the solenoid housing and support units 41 for the shift keys 30. But the item of interest is the radial positioning cams 14. In both FIG. 7 and FIG. 18, the cam shaft 15 is oriented parallel to the intermediate shaft 11, and this shaft is driven in 1:1 synchrony by means of a belt, gears, chain, etc. The cam shaft 15 can be tilted to save some space and to shorten the distance to the idler carriage's contact surface 16 when on the smallest gears. In the parallel version, intermediate cam followers 43 in progressively increasing lengths are placed between the cams 14 and the idler carriage contact surface 16. These extension pieces 43 cannot be readily shown in these figures, but they are included in FIGS. 19C and 19D, which also illustrates how the cams work in general. The principles are the same for both parallel cams 14 (FIGS. 19A and 19B) or tilted cams 14 (FIGS. 19C and 19D.)

FIG. 20 shows the motion to be achieved (short version). A plot of the motion of the long-short version would be the same as shown in FIG. 20 for the short version, except that the horizontal sections would be 50 percent longer. FIGS. 19A and 19B show the action without intermediate extensions; FIGS 19C and 19D show the action with extensions 43. In the beginning position of either pair of diagrams, the radial positioning contact surface 16 corresponds with a running gear 1 position. When an upshift occurs, the idler 3 must move to a larger gear. The radial positioning contact surface 16 can slide from the fixed face 42 corresponding to the running gear 1 during the on-loading phase of moving from the running gear 1 to the ramp gear 2. The radial positioning cam 14 must be at its most extended position for the faces to match. The cam's 14 face matches the fixed face 42 for approximately 90 degrees of rotation. This corresponds to the approximately 90 degrees of the on-loading section on the ramp gear 2. The idler's radial positioning contact surface 16 smoothly transfers from the fixed face 42 to the extended cam 14. This is also the time period when any locking lugs 17 slide out of their slots 18. The idler 3 is then fully on the ramp gear 2, and as the ramp gear 2 begins to push the idler 3 outward, the radial positioning cam 14 is retracting at exactly the same rate. When the idler 3 is completely at the top of the ramp, it can slide off onto the next running gear 1. Likewise, when the radial positioning cam 14 is at its most retracted position for approximately 90 degrees, it presents a matching face from which the radial positioning contact surface 16 can slide onto the next fixed face 42 opposite a running gear 1. It slides onto this fixed face 42, and into any locking slots 18, just as the idler 3 slides onto the next running gear 1.

In upshifting, the radial positioning cam 14 must be at its most extended position in order for the idler carriage 6 to slide from the fixed face 42 onto the radial positioning cam 14. In downshifting, the ramp gear 2 is functioning in the opposite sense, and the idler 3 is moving in the opposite direction, and the radial positioning cam 14 starts in its most retracted position, and ends up in its extended position.

ASSOCIATED ELEMENTS

PLANETARY GEARSET

Although this disclosure presents a complete and functional transmission, it is expected that its primary application will be as a subunit in an automatic transmission. In particular it could replace one of the planetary gearsets. One planetary gearset is needed for the multiple functions of providing range multiplication, reverse, and possibly neutral. Numerous arrangements are possible but one having the planetary gearset between the semi-continuous gearset and the engine is convenient. However both I/O shaft ends are exposed and can be hollow to provide concentric shaft access to the planetary gearset.

The main change involves developing a clutch capable of opening and closing within the time frame of the shifts. Modifying a planetary gearset clutch or inserting a separate, special clutch are both possibilities. Also, the clutch's timing must be perfectly coordinated with shifts, so the natural approach would be to couple the clutch directly with this subunit's mechanisms or else to a mechanism similar in action. In using the described mechanism, the same cam channels could direct a separate follower to disengage the clutch at some leading phase angle. The return engagement would have to be stalled slightly but passive dampeners could do that.

MICROPROCESSOR

The intended design of this semi-continuous subunit is to include about three to five running gears which would give up to twenty or more forward speeds and half as many for reverse. As with many modern transmissions, a microprocessor could be used to control the shifting schedule. This would optimize performance. With so many high speed shifts available, the steps would be imperceptible. The torque changes and shift times would be so slight that engine speed is essentially unaltered. This makes the load on the clutch light but frequent. A microprocessor could also be used to control an independent clutch actuating mechanism. This would be set to operate just a fraction of a second before the shift signal is triggered.

OTHER COMPONENTS OF THE DRIVE TRAIN

To optimize overall performance using a semi-continuous transmission, many of the elements of the drive train should be modified. For example, the engine will no longer be as susceptible to pinging and knocking, so more efficient, higher compression engines could be re-introduced. The approach of designing engines to have flat torque curves over a range could be changed to one of designing engines for a peak efficiency at some optimum torque.

In part, this semi-continuous transmission subunit is meant to supplant the hydrokinetic unit's function of providing smooth speed and torque changes. However, a torque converter is still valuable as a starting device, engine coupler, and drive train dampener.

It may be desirable to use an input and/or final drive combination that permits the transmission to operate at slightly reduced speeds. This is because the inertial forces involved with repositioning the idler increase exponentially. The g-forces increase inversely with the square of the time interval, and the time interval diminishes as a reciprocal. Design parameters for high rpm's need close scrutiny. However, the range of this transmission can be so great that extreme rpm's are unnecessary until the highest gear is reached, at which point it does not matter. High rpm's in the lower gears are less of a problem since the rpm's are intrinsically reduced in the intermediate shaft's gearing.

SYSTEM FEATURES

MANUAL ("PROTECTED SEMI-AUTOMATIC")

The basic mechanism can be configured as a stand-alone, regular transmission. A reverse gear can be realized by adding, for example, a synchromeshed link between the intermediate shaft and the output shaft.

The easiest mechanical shift pattern to design is suitable only for configurations with a single idle and shows a U-pattern rather than the usual H-pattern. In the U-pattern, steps up one arm perform upshifts, the bottom of the U is a neutral, and the other arm results in lower and lower gears. This arrangement may seem strange, but since shifts occur in a split second, selection is very easy. A detailed description is omitted since a "shift-by-wire" scheme is recommended. Also as discussed, configurations with two idlers are recommended. In any case a fail-safe mechanism preventing inappropriate shifts is needed.

Clutch timing is unimportant as long as the clutch is depressed when the shift is triggered. Lead and lag times only control the smoothness of the transition. An apprentice driver would never grind a gear. This new design provides a 5-speed (up to 7-speed) transmission that is very similar in terms of the total number of gears, total number of components, weight, efficiency, cost, ease of manufacture, and assembly compared to representative 5-speed transmissions of today. The biggest difference is from the driver's point of view, namely the ease of changing gears.

AUTOMATIC

Replacing one of the planetary gearsets of a representative automatic transmission with this new design gives an automatic transmission with 14 to 30 easily selected speeds. The challenge is for designers and programmers to code a shift schedule capable of managing, and even taking advantage of, these opportunities.

Figure 21:
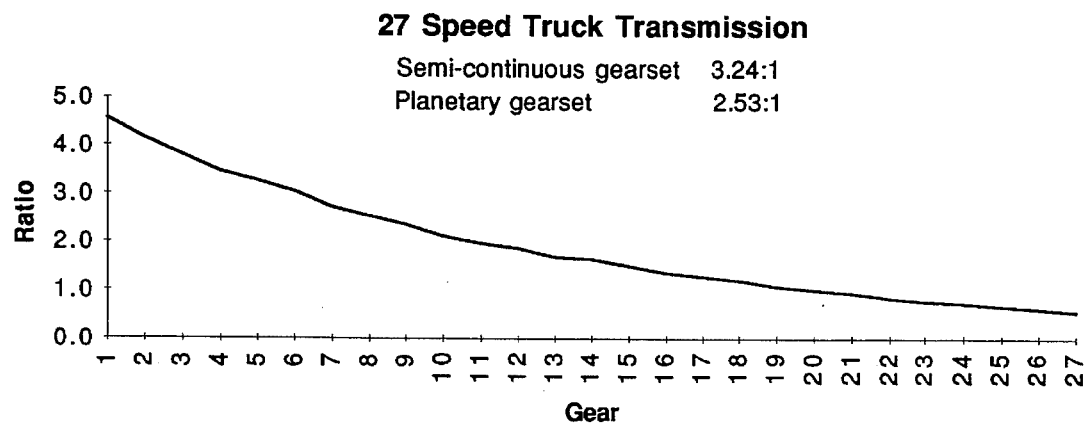

FIG. 21 shows a partially adjusted curve for a 27-speed, light truck transmission plotting gear ratio against drive range. It is adjusted by eliminating any gear ratios that overlap within the range of the planetary exchange. That is, all of the lower gears run with planetary reduction and all of the higher gears run with direct coupling. The planetary gearset's state does not constantly change back and forth. It has only one shift point. The gear ratios on either side of this shift point are essentially identical, and this accounts for the nearly flat spot between speeds 13 and 14. During this transition, several levels of idler movement or shifting will occur, but this can occur within the time frame of the planetary gearset's changing. This will still be practically imperceptible to the driver and to the drive train.

This particular curve was selected because it was naturally smooth, but if this subunit is being used in an automatic transmission, the shifting schedule itself can smooth out irregularities.

From the narrow point of view of strictly fuel economy, increasing the number of gears for an unmodified engine from 4 to 12 and from 12 to 20 results in only modest improvements with diminishing returns. Gain in economy obtains primarily from increasing the overall ratio spread which is normally less than 5:1. It is 8.2:1 in the illustrated example (FIG. 21). FIGS. 7 and 18 have even higher potential overall ratios. This is another reason why this design which retains its very high efficiency at all driving speeds, including very slow speeds, is superior to both conventional and continuously variable transmission designs.

The above and many other modifications may be made to the described invention within the scope of the appended claims.

I claim:

1. A variable speed mechanism comprised of a primary rotatable shaft having a plurality of substantially contiguous gears of varying diameters with helical cut teeth;

said contiguous gears being comprised of a plurality of circular gears of varying diameters separated by, and alternating with, a plurality of ramp gears;

said ramp gears being eccentrically disposed and comprised of circular sectors on diametrically opposite sides matching equivalent sectors of said adjacent pairs of circular gears;

said diametrically opposed sectors being joined by sectors of progressive and continuously changing radius thus forming a complete and bilaterally symmetrical gear providing continuous helical tracks between said pairs of circular gears;

at least one mating gear with compatible helical cut teeth mounted on a parallel shaft;

said parallel shaft having means of radial movement relative to the fixed centerline of the primary rotatable shaft;

said mating gear having means to longitudinally slide between all pairs of said circular gears by following said continuous helical track across said ramp gears when said sliding action is timed in coordination with the rotation of said ramp gears.

2. A transmission having a variable speed mechanism using helical cut gears comprising;

a geared driving shaft;

a geared driven shaft;

an intermediate shaft with a plurality of fixed, circular gears of varying diameters concentrically mounted in progressive order and alternating with contiguously aligned ramp gears, fixedly mounted in an eccentric pattern so providing a continuous path between any and all pairs of said circular gears;

a first idler gear pivotally mounted about said input shaft, slideably and permanently engaged with said intermediate shaft;

a second idler gear pivotally mounted about said output shaft, slideably and permanently engaged with said intermediate shaft;

a first longitudinally moveable linkage communicating with said first idler gear providing shifting means in coordination with said intermediate shaft and with activation controlled by means of digital electronic circuitry;

a second longitudinally moveable linkage communicating with said second idler gear providing shifting means under coordination with said intermediate shaft and with activation controlled by means of digital electronic circuitry.

3. A variable speed mechanism as set forth in claim 2, wherein the face width of said circular gears exceeds the relative width of said idler gears to such an extent that during shifting said idler gears achieve accelerated motion before contact with said ramp gears.

4. A variable speed mechanism as set forth in claim 2, wherein the face width of said ramp gears exceeds the relative face width of said idler gears to such an extent that the longitudinal component of the shifting motion of said idler gears across the face of said ramp gears can proceed uninterrupted to achieve reduced peak inertial forces during said shifting motions.

5. A variable speed mechanism as set forth in claim 2, wherein positioning means for said idler gears enables precise control relative to said ramp gears during shifting and relative to said circular gears when locked into running position.

6. A transmission as set forth in claim 2 in combination with an automatic clutch precisely coordinated with said shifting motions of said variable speed mechanism.

7. A transmission as set forth in claim 2 comprising said variable speed mechanism in combination with a planetary gearset.

8. A transmission having a variable speed mechanism comprising;

- a rotatable intermediate shaft with a plurality of fixed, circular gears of varying diameters alternating with fixed, ramp gears aligned between each sequential pair of said circular gears, said ramp gears providing a continuous path for a permanently engaged mating gear sliding between said circular gears;

- a rotatable input shaft with one or more gears;

- a rotatable output shaft with one or more gears;

- a first idler shaft pivotally mounted about the axis of the input shaft with at least one shiftable idler gear permanently engaged with said intermediate shaft;

- a second idler shaft pivotally mounted about the axis of the output shaft with at least one shiftable idler gear permanently engaged with said intermediate shaft;

- a shifting means to move said shiftable idler gears engaged with said intermediate shaft gears to effect a change in speed ratio with control means coordinated by digital electronic circuitry and with timing referenced to the rotational position of said intermediate shaft;

- a positioning means to rigidly define and control the position of said shiftable idler gears in all dimensions and during all times of steady-state operation and during all times of shifting, comprising a three-dimensionally contoured guide track in combination with said ramp gears of materially greater width than said circular gears and of said idler gears, said ramp gears permitting uninterrupted longitudinal motion of said idler gears during transit across said ramp gears.

9. A variable speed mechanism as set forth in claim 8, wherein helically cut gear teeth are used throughout.

10. A variable speed mechanism as set forth in claim 8 in combination with at least one planetary gearset.

11. A transmission as set forth in claim 8 in combination with a clutch activated in coordination with said shifting motion on said variable speed mechanism.

* * * * *